(12) United States Patent
Kamio et al.

(10) Patent No.: US 12,131,404 B2
(45) Date of Patent: Oct. 29, 2024

(54) INFORMATION PROCESSING DEVICE, INFORMATION PROCESSING METHOD, AND INFORMATION PROCESSING PROGRAM

(71) Applicant: SONY GROUP CORPORATION, Tokyo (JP)

(72) Inventors: Kazunori Kamio, Kanagawa (JP); Toshiyuki Sasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 502 days.

(21) Appl. No.: 17/421,985

(22) PCT Filed: Feb. 6, 2020

(86) PCT No.: PCT/JP2020/004542
§ 371 (c)(1),
(2) Date: Jul. 9, 2021

(87) PCT Pub. No.: WO2020/170835
PCT Pub. Date: Aug. 27, 2020

(65) Prior Publication Data
US 2022/0114768 A1   Apr. 14, 2022

(30) Foreign Application Priority Data
Feb. 18, 2019   (JP) .................. 2019-026914

(51) Int. Cl.
*G06T 11/00*   (2006.01)
*G06T 5/70*   (2024.01)
(Continued)

(52) U.S. Cl.
CPC ............... *G06T 11/00* (2013.01); *G06T 5/70* (2024.01); *G06T 7/20* (2013.01); *G06T 7/70* (2017.01);
(Continued)

(58) Field of Classification Search
CPC . G06T 11/00; G06T 7/70; G06T 5/002; G06T 7/20; G06T 2207/30252; G06V 10/751
See application file for complete search history.

(56) References Cited

U.S. PATENT DOCUMENTS

2005/0226508 A1* 10/2005 Gotohda ............... G06V 40/10
382/209
2007/0165112 A1   7/2007 Shinmei
(Continued)

FOREIGN PATENT DOCUMENTS

CN   102782720 A   11/2012
CN   102790870 A   11/2012
(Continued)

OTHER PUBLICATIONS

Zhu Xinyan et al. Preliminary Study on Conception and Key Technologies of the Location-based Pan-Information Map; Geomatics and Information Science of Wuhan University, vol. 40, No. 3 Mar. 31, 2015.
(Continued)

*Primary Examiner* — Syed Haider
(74) *Attorney, Agent, or Firm* — Paratus Law Group, PLLC

(57) ABSTRACT

An information processing device according to the present disclosure includes an inference unit that infers, on the basis of a result of checking a first image against a plurality of images taken in the past, a third image that is an image taken in the past at a position corresponding to a second image to be taken at a next timing of the first image, and a generation unit that generates a fourth image that is an image obtained by correcting the second image on the basis of the third image in a case where the second image is acquired.

12 Claims, 13 Drawing Sheets

(51) Int. Cl.
 *G06T 7/20* (2017.01)
 *G06T 7/70* (2017.01)
 *G06V 10/75* (2022.01)

(52) U.S. Cl.
 CPC .. *G06V 10/751* (2022.01); *G06T 2207/30252* (2013.01)

(56) References Cited

U.S. PATENT DOCUMENTS

| | | |
|---|---|---|
| 2014/0368656 A1 | 12/2014 | Hayakawa |
| 2015/0161881 A1 | 6/2015 | Takemura |
| 2016/0021313 A1* | 1/2016 | Matsumoto ............... B60R 1/00 348/148 |
| 2019/0204093 A1* | 7/2019 | Cantrell ................ B64C 39/024 |
| 2019/0369637 A1* | 12/2019 | Shalev-Shwartz ..... G06V 20/56 |
| 2020/0068434 A1* | 2/2020 | Pedersen ................. H04W 4/46 |

FOREIGN PATENT DOCUMENTS

| | | |
|---|---|---|
| CN | 103477624 A | 12/2013 |
| CN | 104954734 A | 9/2015 |
| CN | 108779984 A | 11/2018 |
| JP | 2003-244688 A | 8/2003 |
| JP | 2006-298256 A | 11/2006 |
| JP | 2006-311299 A | 11/2006 |
| JP | 2006331058 A | 12/2006 |
| JP | 2010-026713 A | 2/2010 |
| JP | 2013-055410 A | 3/2013 |
| JP | 2015-155903 A | 8/2015 |
| JP | 2018-077771 A | 5/2018 |

OTHER PUBLICATIONS

Feng Peiyun, Application of computer in image area feature description and measurement, Automation and Instrumentation, No. 7, Jul. 31, 2018, Full text.

* cited by examiner

FIG. 6

| IMAGE ID | IMAGE DATA | GPS DATA | TRAVELING SPEED | DATE AND TIME OF UPDATE | WEATHER | PARAMETER | ... |
|---|---|---|---|---|---|---|---|
| ... | ... | ... | ... | ... | ... | ... | ... |
| P31 | A31 | B31 | 30km/h | D31 | RAIN | E31 | ... |
| P32 | A32 | B32 | 30km/h | D32 | RAIN | E32 | ... |
| ... | ... | ... | ... | ... | ... | ... | ... |

121

INFORMATION PROCESSING DEVICE, INFORMATION PROCESSING METHOD, AND INFORMATION PROCESSING PROGRAM

CROSS REFERENCE TO PRIOR APPLICATION

This application is a National Stage Patent Application of PCT International Patent Application No. PCT/JP2020/004542 (filed on Feb. 6, 2020) under 35 U.S.C. § 371, which claims priority to Japanese Patent Application No. 2019-026914 (filed on Feb. 18, 2019), which are all hereby incorporated by reference in their entirety.

TECHNICAL FIELD

The present disclosure relates to an information processing device, an information processing method, and an information processing program. More specifically, the present disclosure relates to image processing utilized for autonomous driving of a traveling object.

BACKGROUND ART

As a technique related to traveling objects such as automobiles, there is known a technique for sensing and evading obstacles in advance, such as an Advanced Driver Assistance System (ADAS). A traveling object utilizes such a technique to autonomously drive.

Regarding autonomous driving, there is known a technique for matching using a geographical feature value to measure a position where a vehicle that autonomously drives is traveling (for example, Patent Document 1). Furthermore, there is known a technique for controlling, on the basis of a correlation with pseudo road surface information, whether to autonomously drive or execute notification of a manual driving preparation request (for example, Patent Document 2).

CITATION LIST

Patent Document

Patent Document 1: Japanese Patent Application Laid-Open No. 2015-155903
Patent Document 2: Japanese Patent Application Laid-Open No. 2018-77771

SUMMARY OF THE INVENTION

Problems to be Solved by the Invention

According to a prior art, safety of autonomous driving can be improved by estimating a self-position during autonomous driving on the basis of data of a previously acquired geographical feature value, or the like.

However, there is room for improvement in the prior art. For example, in a case where an environment (weather, illuminance, or the like) at a present time is significantly different from a past environment even if trying to estimate self-position on the basis of various data, adoption to change in the situation may fail, and such information may not be utilized for autonomous driving.

Therefore, the present disclosure proposes an information processing device, an information processing method, and an information processing program capable of obtaining an image for which deterioration in image quality due to an environmental change is reduced.

Solutions to Problems

In order to solve the above-described problems, the information processing device according to one form of the present disclosure includes an inference unit that infers, on the basis of a result of checking a first image against a plurality of images taken in the past, a third image that is an image taken in the past at a position corresponding to a second image to be taken at a next timing of the first image, and a generation unit that generates a fourth image that is an image obtained by correcting the second image on the basis of the third image in a case where the second image is acquired.

BRIEF DESCRIPTION OF DRAWINGS

FIG. 6 is a diagram illustrating an example of an image data table according to the embodiment of the present disclosure.

MODES FOR CARRYING OUT THE INVENTION

Embodiments of the present disclosure will be described below on the basis of the drawings. Note that, in each of the following embodiments, the same parts are provided with the same reference signs, so that repeated description of these parts is omitted.

The present disclosure will be described in the following item order.

1. Embodiment
1-1. An example of information processing according to an embodiment
1-2. Configuration of information processing device according to the embodiment
1-3. Information processing procedures according to the embodiment
1-4. Modifications according to the embodiment
1-4-1. Utilization of map data, or the like
1-4-2. Application to cases other than autonomous driving
2. Other embodiments
2-1. Configuration of traveling object
2-2. Others
3. Effects of information processing device according to the present disclosure
4. Hardware configuration

1. Embodiment

1-1. An Example of Information Processing According to an Embodiment

Figure 1:
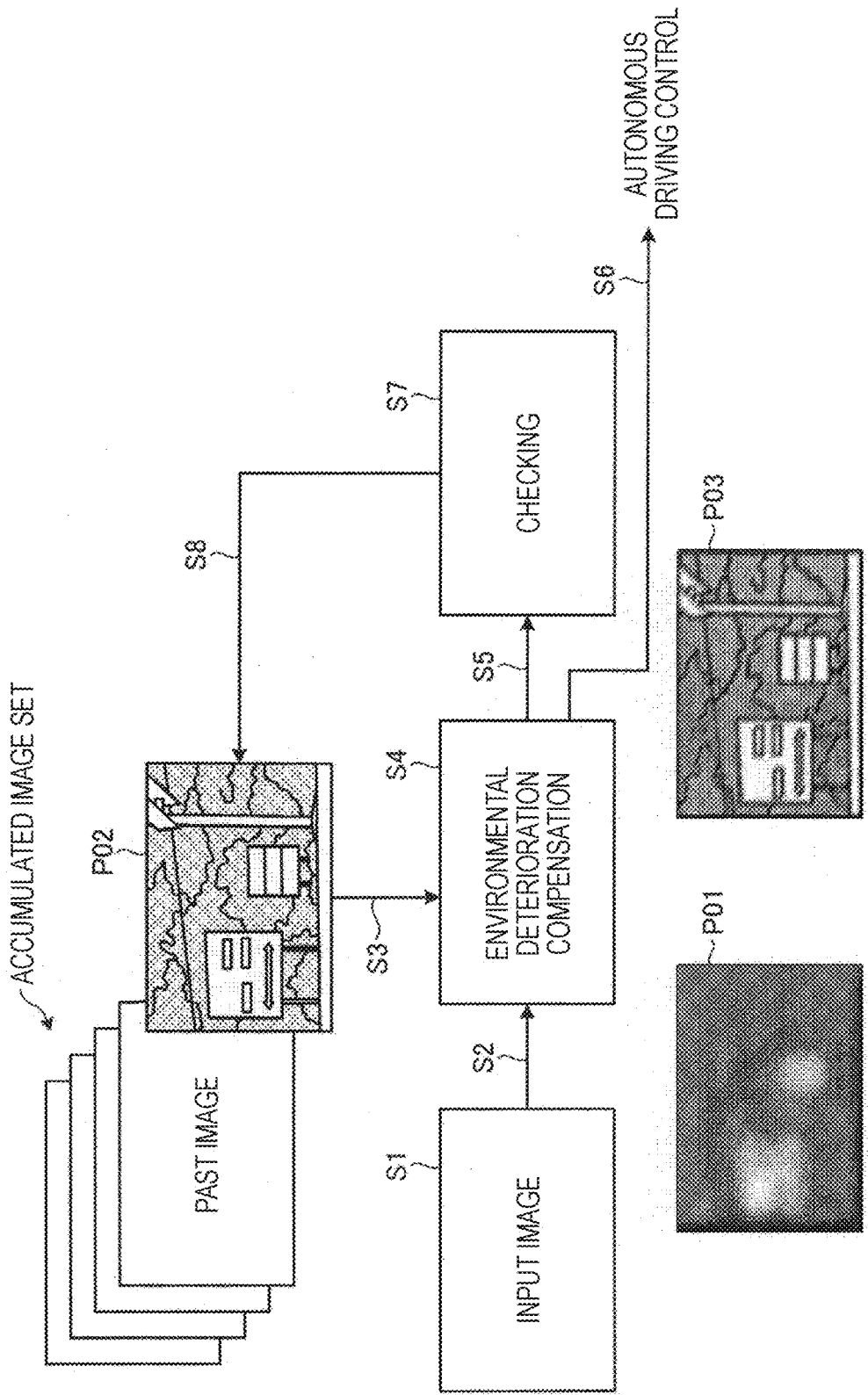
FIG. 1 is a diagram illustrating an overview of information processing according to an embodiment of the present disclosure.

FIG. 1 is a diagram illustrating an example of information processing according to an embodiment of the present disclosure. Specifically, FIG. 1 illustrates a block diagram illustrating a flow of information processing according to the present disclosure.

The information processing according to the embodiment of the present disclosure is applied to, for example, a case where a predetermined traveling object that autonomously drives determines an appropriate traveling position or recognizes a peripheral object in order to prevent a crash, or the like. In the embodiment, an automobile is taken as an example as the predetermined traveling object. Furthermore, the information processing according to the embodiment is executed by an information processing device 100 (illustration omitted in FIG. 1) mounted on the automobile.

The information processing device 100 observes a surrounding situation with a sensor and recognizes a peripheral object on the basis of an observation result. In the embodiment, the information processing device 100 takes an image of surroundings and acquires an image by using a camera including an image sensor. Then, the information processing device 100 obtains information for autonomous driving by performing image recognition processing on the acquired image.

By the way, in a traveling automobile, it is not always able to take an image by which image recognition is appropriately performed. For example, an image taken by a traveling automobile is susceptible to an environmental influence. Specifically, the environmental influence is a decrease in contrast due to backlight or haze (fog or mist), or is obstruction of visibility due to weather, such as rain or snow, or dirt on a camera lens. Furthermore, the environmental influence also includes insufficient light amount due to taking an image at night or during traveling in a tunnel. That is, an image taken by a traveling automobile is strongly affected by a shooting environment.

Note that, there is also known a conventional technique that utilizes past traveling data or past driving data to avoid influence to a shooting environment. However, if an environment in which past data is obtained and an environment during actual traveling are different, there may be a risk in autonomous driving utilizing the past data as is. That is, a problem in achieving safe autonomous driving is that it is necessary to obtain an image from which environmental influence is eliminated as much as possible, the image being taken during actual traveling.

Therefore, the information processing device 100 according to the present disclosure solves the above-described problems by using the processing described below. Specifically, the information processing device 100 performs processing called environmental deterioration compensation on an image including noise, such as an image that has been subjected to environmental influence, to correct the image. For example, in environmental deterioration compensation, an image from which noise is removed can be generated by using pixel information of a less deteriorated image to correct another image including the same subject and deteriorated due to an environment. That is, in order to perform environmental deterioration compensation, there is a need for a less deteriorated image including a subject substantially the same as a subject in an image to be corrected (the image taken at substantially the same shooting position, angle, or angle of view), as an image corresponding to the image to be corrected (hereinafter referred to as "image for checking").

Regarding this point, on the basis of a result of checking a predetermined image taken during autonomous driving against a plurality of previously accumulated images taken in the past, the information processing device 100 according to the present disclosure infers an image, which is an image taken in the past at a position corresponding to an image to be taken at a next timing in the autonomous driving, to be an image for checking. Then, in a case where an image is actually taken at the next timing, the information processing device 100 corrects the taken image on the basis of the image for checking and generates a new, less deteriorated image.

That is, the information processing device 100 performs image recognition processing for autonomous driving while correcting, on the basis of less deteriorated images accumulated during a past traveling, the image taken at a present time. For this reason, the information processing device 100 can perform image recognition processing on the basis of, rather than past data, an image of a present time from which influence of noise is removed, and therefore can achieve stable autonomous driving without being affected by an environmental change. Note that the information processing device 100 does not always require the information processing device 100 to take images, and may perform the above-described processing by acquiring an image taken by, for example, an external image taking device, or the like.

Hereinafter, an example of information processing executed by the information processing device 100 according to the present disclosure will be described by using FIGS. 1 to 4. Note that, in the following description, it is assumed that the information processing device 100 is mounted on an automobile as a traveling object, or that the automobile itself functions as the information processing device 100. That is, in the following description, the information processing device 100 can be read as an automobile (traveling object).

In the example illustrated in FIG. 1, it is assumed that the information processing device 100 has a plurality of past images (accumulated image set) taken and acquired during traveling in the past. Note that the accumulated image set may be read as a series of moving images taken during a past traveling. For example, in the example in FIG. 1, it is assumed that the information processing device 100 travels on the same road on a regular basis every day, and in the process, acquires an accumulated image set.

First, the information processing device 100 takes an image of surroundings by using a camera and acquires the image during traveling by autonomous driving (step S1). Hereinafter, an image taken during actual traveling will be referred to as an "input image". In the example in FIG. 1, the information processing device 100 acquires an image P01 as an input image.

In the example in FIG. 1, the image P01 is assumed to be an image deteriorated due to influence of fog, or the like, for example. A deteriorated image is, for example, an image that is not clear due to low transmittance or blurring as compared to a normal image. Alternatively, the deteriorated image means an image having an extremely strong altitude in a part due to influence of backlight or the like, or an image in which brightness of the entire image cannot be secured due to influence of being taken at night. For example, if a deteriorated image is utilized for autonomous driving, accuracy of object recognition or the like decreases, by which risk of an accident or the like in autonomous driving is increased.

Therefore, the information processing device 100 performs processing for correcting the image P01, which is deteriorated. Specifically, the information processing device 100 sends the image P01 acquired in step S1 to a processing unit for image deterioration compensation (step S2). Furthermore, from the accumulated image set, the information processing device 100 identifies an image P02, which is the image for checking corresponding to the image P01, and sends the image P02 to the processing unit for image deterioration compensation (step S3). Note that details of processing for identifying the image P02 will be described later.

The image P02 is an image taken at substantially the same shooting position, angle, or angle of view as the image P01, and is a less deteriorated image as compared to the image P01. The information processing device 100 performs environmental deterioration compensation processing on the image P01 on the basis of pixel information included in the image P02 (step S4). Detailed processing of environmental deterioration compensation will be described later. The information processing device 100 performs environmental deterioration compensation and generates an image P03, which is obtained by removing influence of an environment such as fog from the image P01 (hereinafter, referred to as a "restored image").

Thereafter, the information processing device 100 sends the image P03, the restored image, to a processing unit for checking (step S5). Furthermore, the information processing device 100 controls autonomous driving by utilizing the image P03 (step S6). The information processing device 100 can perform more high-security autonomous driving control by using the image P03, which is an image clearer than the image P01.

On the basis of the image P03 acquired in step S05, the information processing device 100 checks an image acquired by the information processing device 100 at a next timing against the accumulated image set (step S7). The image acquired by the information processing device 100 at the next timing is an image taken while the information processing device 100 is traveling. In the example in FIG. 1, the image acquired by the information processing device 100 at the next timing is an image acquired by the information processing device 100 next to the image P01. The next timing at which an image is acquired is determined, for example, by a specification of a camera of the information processing device 100. Specifically, the next timing at which an image is acquired is determined on the basis of a frame rate, or the like, in moving image shooting. For example, in a case where a frame rate is 30 frame per second (fps), the next timing at which an image is acquired is 1/30 seconds later.

On the basis of the information checked in step S7, the information processing device 100 infers, from the accumulated image set, an image that may be a candidate for the image for checking (hereinafter, referred to as "candidate image") for the image to be acquired next to the image P01 (step S8). For example, in a case where the frame rate is 30 fps, the information processing device 100 infers an image taken 1/30 seconds after the image P02 to be a candidate image in an accumulated image set including the image P02.

Figure 2:
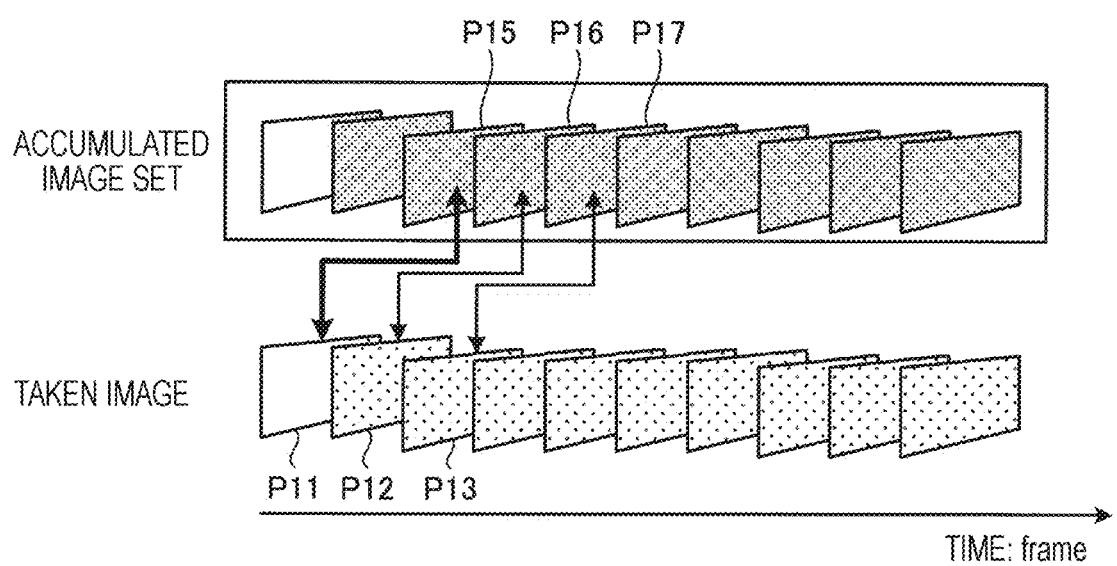
FIG. 2 is a diagram (1) describing information processing according to the embodiment of the present disclosure.

This point will be described by using FIG. 2. FIG. 2 is a diagram (1) describing information processing according to the embodiment of the present disclosure. FIG. 2 conceptually illustrates how the images taken by the information processing device 100 are checked against the accumulated image set.

In the example in FIG. 2, the accumulated image set is a series of moving images acquired and accumulated before the taken images are obtained. Furthermore, the taken images are moving images that the information processing device 100 continues to acquire during traveling. That is, the accumulated image set and the taken images are moving images obtained at different timings by the information processing device 100 traveling on the same road.

By the processing illustrated in FIG. 1, It is assumed that the information processing device 100 judges through the checking that an image P11 and an image P15 are in pairs corresponding to each other. Thereafter, the information processing device 100 acquires an image P12 as a taken image, but before that, infers an image P16 that is predicted to correspond to the image P12.

For example, on the basis of traveling speed of when the accumulated image set is obtained and traveling speed of when the image P11 is acquired, the information processing device 100 infers a candidate image corresponding to the image P12 predicted to be taken next. Specifically, in a case where traveling speed of when the accumulated image set is obtained and traveling speed of when the image P11 is acquired are the same, the information processing device 100 infers the image P16 to be the candidate image corresponding to the image P12 predicted to be taken next to the image P11, the image P16 being a next image when the image P12 is obtained. Alternatively, in a case where traveling speed of when the accumulated image set is obtained and traveling speed of when the image P11 is acquired are different from each other, the information processing device 100 infers a candidate image, which is shifted by a speed difference, to be an image corresponding to the image P12.

Because the processing illustrated in FIG. 2 is continued as long as autonomous driving is continued, the information processing device 100 matches the image P12 and the image P16, and then infers a candidate image corresponding to an image P13, which is an image to be acquired at a next timing. Specifically, the information processing device 100 infers an image P17 as an image corresponding to the image P13. In this way, the information processing device 100 matches a plurality of images taken in the past and images taken at a present time one after another. Furthermore, the information processing device 100 sequentially performs environmental deterioration compensation by using corresponding image pairs.

Figure 3:
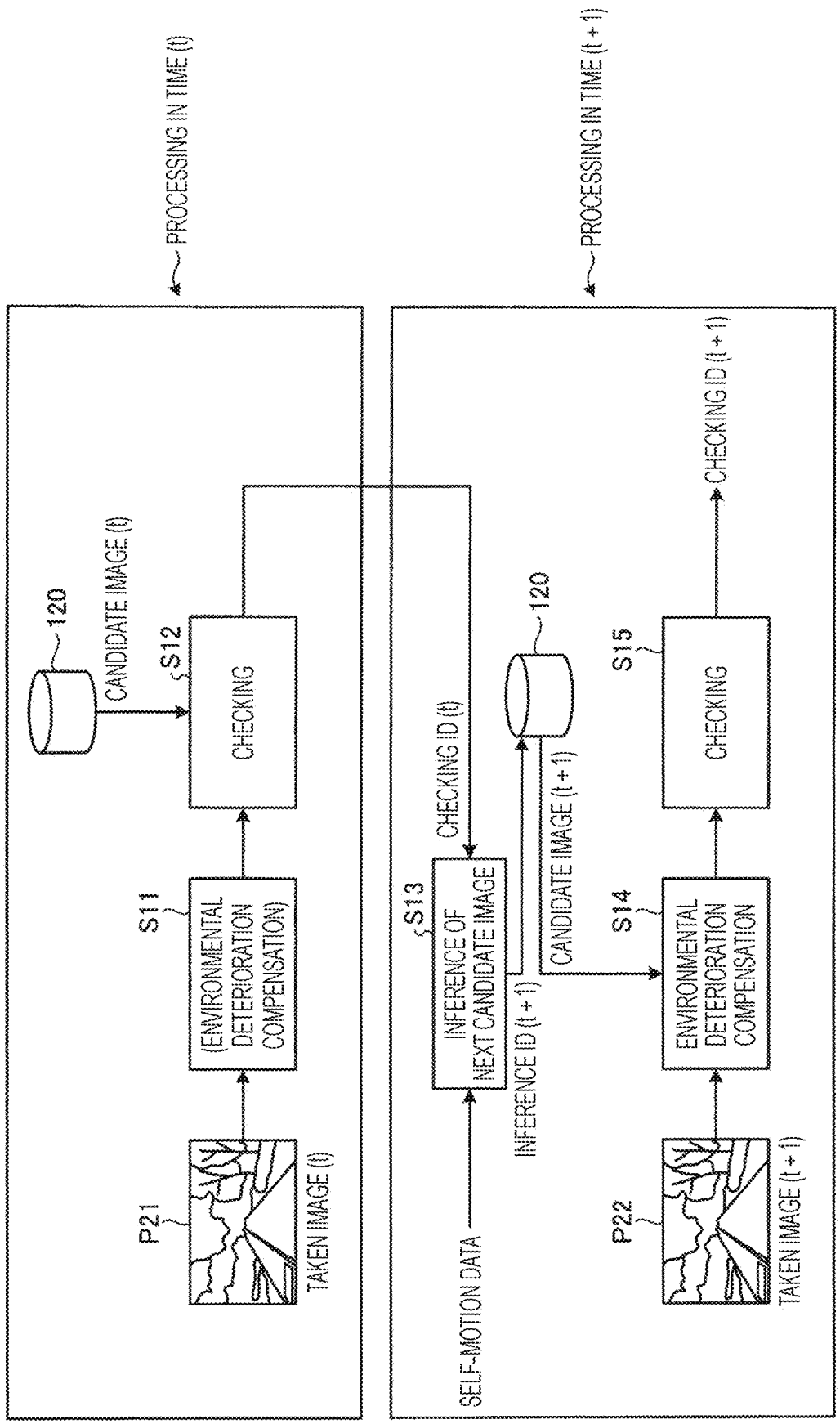
FIG. 3 is a diagram (2) describing the information processing according to the embodiment of the present disclosure.

This point will be described by using FIG. 3. FIG. 3 is a diagram (2) describing the information processing according to the embodiment of the present disclosure. FIG. 3 illustrates a block diagram illustrating a situation in which environmental deterioration compensation and checking processing are repeatedly performed.

The information processing device 100 acquires a taken image P21 at a certain time (t). The taken image P21 is also represented as a taken image (t) due to being an image acquired at a time (t).

If possible, the information processing device 100 performs environmental deterioration compensation on the taken image (t) (step S11). Note that in a case where the taken image (t) is an earliest image in the information processing according to the present disclosure, the information processing device 100 skips step S11 because there is no image for checking used for performing environmental deterioration compensation.

Thereafter, the information processing device 100 checks the taken image (t) against the candidate image (t) that is an image corresponding to the taken image (t) (step S12). The information processing device 100 assigns identification information (checking ID (t)) to information regarding this checking (for example, information regarding the candidate image (t) or regarding an image in vicinity of the candidate image (t)), and sends the checking information to a next processing unit.

The information processing device 100 infers a candidate image for checking against an image to be taken next at time (t+1) (step S13). The information processing device 100 acquires self-motion data of traveling speed or position information, or the like, about which road the vehicle is traveling on, and infers a next candidate image on the basis of the acquired data. The information processing device 100 issues an inference ID (t+1) indicating information regarding this inference (for example, identification information for identifying a candidate image (t+1), or the like), and inquires of a storage unit 120.

The information processing device 100 extracts a candidate image (t+1) from the storage unit 120. Then, the information processing device 100 performs environmental deterioration compensation on a taken image P22 obtained at the time (t+1) on the basis of the candidate image (t+1) (step S14). Moreover, the information processing device 100 performs a checking processing on an image generated after the environmental deterioration compensation (step S15). The information processing device 100 issues a checking ID (t+1) and repeats the processing in step S13 and subsequent steps.

With this arrangement, the information processing device 100 can continue autonomous driving by using an image that is an image taken during traveling at a present time and less affected by environmental deterioration, and therefore can continue high-security autonomous driving control.

Figure 4:
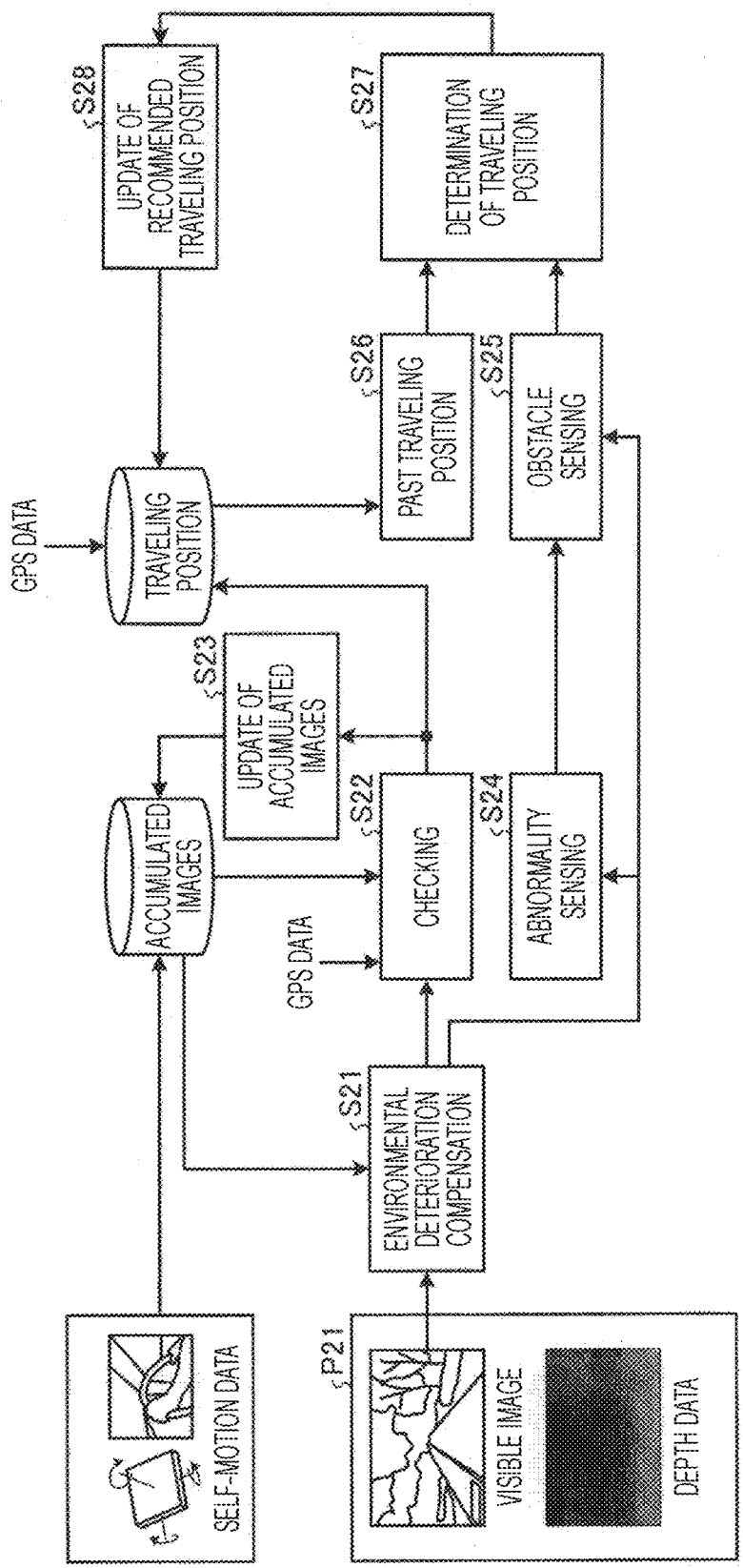
FIG. 4 is a diagram (3) describing the information processing according to the embodiment of the present disclosure.

Next, a flow of information processing including autonomous driving control is illustrated by using FIG. 4. FIG. 4 is a diagram (3) describing the information processing according to the embodiment of the present disclosure. FIG. 4 illustrates a flow of entire information processing including autonomous driving control as a block diagram.

As illustrated in FIG. 4, the information processing device 100 acquires the taken image P21 during autonomous driving. At this time, the information processing device 100 may acquire, as the taken image P21, not only a visible image but also depth data by using a depth sensor, or the like. As described with reference to FIGS. 1 to 3, the information processing device 100 performs environmental deterioration compensation on the acquired taken image P21 (step S21). The information processing device 100 may utilize self-motion data in processing of inferring an image for checking corresponding to the taken image P21.

Thereafter, the information processing device 100 sends a restored image generated through the environmental deterioration compensation to the checking processing (step S22). At this time, the information processing device 100 may acquire Global Positioning System (GPS) data and utilize the data for checking processing.

Thereafter, the information processing device 100 may compare the restored image with the image for checking, select a clearer image, and update accumulated images (step S23). The information processing device 100 accumulates the selected images and prepares the images for next environmental deterioration compensation on a taken image.

Furthermore, the information processing device 100 sends the restored image generated after the environmental deterioration compensation to a processing unit that performs abnormality sensing. The information processing device 100 performs image recognition processing on the restored image and performs abnormality sensing (step S24). Furthermore, the information processing device 100 sends the restored image to a processing unit that performs obstacle sensing to perform obstacle sensing (step S25).

Furthermore, the information processing device 100 refers to a storage unit in which traveling data such as a past traveling position is stored, and acquires a past traveling position (step S26). For example, the information processing device 100 acquires past driving history, such as a traveling position or traveling speed adopted in the past on a road traveled at a present time. Then, the information processing device 100 determines a traveling position in an autonomous driving on the basis of information regarding the obstacle sensing in step S25, information regarding traveling position in the past, or the like (step S27).

Thereafter, in a case where the traveling position traveled at the present time is appropriate, the information processing device 100 updates a recommended traveling position on the basis of the information (step S28). The information processing device 100 stores the updated information in the storage unit to prepare the information for future autonomous driving.

In this way, the information processing device 100 performs image processing for correcting environmental influence by using a less deteriorated image taken on a route passed in the past. With this arrangement, the information processing device 100 enables stable autonomous driving without being affected by an environmental change.

Hereinafter, a configuration of the information processing device 100 that executes the above-described information processing and details of processing for checking and for environmental deterioration compensation will be described in detail by using FIG. 5.

1-2. Configuration of Information Processing Device According to the Embodiment Configuration of the information processing device 100 will be described by using FIG. 5. FIG. 5 is a diagram illustrating a configuration example of the information processing device 100 according to the embodiment of the present disclosure. As illustrated in FIG. 5, the information processing device 100 has a communication unit 110, the storage unit 120, a control unit 130, a sensing unit 140, an input unit 150, and an output unit 160. Note that the configuration illustrated in FIG. 5 is a functional configuration, and a hardware configuration may be different from the functional configuration. Furthermore, functions of the information processing device 100 may be distributed and implemented in a plurality of physically separated devices.

The communication unit 110 is achieved by, for example, a network interface card (NIC), or the like. The communication unit 110 may be a universal serial bus (USB) interface including a USB host controller, a USB port, or the like. Furthermore, the communication unit 110 may be a wired interface or a wireless interface. For example, the communication unit 110 may be a wireless communication interface of a wireless LAN system or a cellular communication system. The communication unit 110 functions as a communication means or transmission means of the information processing device 100. For example, the communication unit 110 is connected to a network N (the Internet, or the like) by wire or wirelessly, and transmits or receives information to or from another information processing terminal, or the like, via the network N.

The storage unit 120 is implemented by, for example, a semiconductor memory device such as a random access memory (RAM) or flash memory (flash memory), or a storage device such as a hard disk or an optical disk. The storage unit 120 stores various data.

For example, the storage unit 120 stores a learning machine (image recognition model) that has learned an object to be detected, data related to the detected object, or the like, for image recognition processing in autonomous driving. Furthermore, the storage unit 120 may store map data, or the like, for executing autonomous driving.

Furthermore, the storage unit 120 may store information regarding a vehicle controlled by autonomous driving by the information processing device 100. For example, the storage unit 120 stores information such as a size, weight, or vehicle type of a vehicle body.

Furthermore, the storage unit 120 has an image data table 121, which is a data table that accumulates images taken during traveling in the past. FIG. 6 illustrates an example of the image data table 121 according to the embodiment. FIG. 6 is a diagram illustrating an example of the image data table 121 according to the embodiment of the present disclosure. In the example illustrated in FIG. 6, the image data table 121 has items such as "image ID", "image data", "GPS data", "traveling speed", "date and time of update", "weather", and "parameter".

The "image ID" indicates identification information for identifying an image. "Image data" indicates pixel data that constitutes an image. Note that, although image data is indicated by concept of "A31" in the example in FIG. 6, specific information, such as the number of pixels that constitute the image or color information for each of the pixels, is actually stored as an item of image data.

The "GPS data" indicates GPS data indicating a position of the information processing device 100 (automobile) when an image is acquired. The "traveling speed" indicates traveling speed of the information processing device 100 (automobile) when an image is acquired. The "date and time of update" indicates date and time of update to a latest image at a position where an image is taken. "Weather" indicates weather when an image is acquired.

"Parameter" indicates various parameters when an image is acquired. The parameters include, for example, exposure time when an image is taken, whether or not filter processing for removing rain, or the like, is performed, each numerical value or setting value, or the like of intensity of noise reduction (NR) processing, and the like.

That is, the example illustrated in FIG. 6 indicates that, for an image with an image ID "P31", image data is "A31", GPS data when the image is taken is "B31", traveling speed is "30 km/h", date and time of update is "D31", weather is "rain", and a parameter is "E31".

Description will be continued returning to FIG. 5. The sensing unit 140 senses various pieces of information related to the information processing device 100. Specifically, the sensing unit 140 senses environment around the information processing device 100, information of where the information processing device 100 is positioned, the information regarding an apparatus connected to the information processing device 100, or the like. The sensing unit 140 may be read as a sensor that senses various kinds of information. The sensing unit 140 according to the embodiment has an imaging unit 141 and a measurement unit 142.

The imaging unit 141 is a sensor having a function of capturing an image of surroundings of the information processing device 100, and is a so-called camera. For example, the imaging unit 141 is implemented by a stereo camera, a monocular camera, a lens-less camera, or the like.

The measurement unit 142 is a sensor that measures information of the information processing device 100 and a vehicle on which the information processing device 100 is mounted.

For example, the measurement unit 142 senses behavior of the information processing device 100 and the vehicle on which the information processing device 100 is mounted. For example, the measurement unit 142 is an acceleration sensor that senses acceleration of a vehicle, a gyro sensor that senses behavior of a vehicle, an inertial measurement unit (IMU), or the like.

Furthermore, the measurement unit 142 may measure behavior of an automobile on which the information processing device 100 is mounted. For example, the measurement unit 142 measures operation amount of a brake, accelerator, or steering of an automobile. For example, the measurement unit 142 measures an amount corresponding to force (pressure, or the like) applied to a brake or accelerator by utilizing a sensor, or the like, mounted on each of the brake, accelerator, and steering of the automobile. Furthermore, the measurement unit 142 may measure velocity, acceleration, acceleration and deceleration amount, yaw rate information, or the like of the automobile. The measurement unit 142 may measure information regarding the behavior of the automobile by various known techniques, not limited to the above-described sensors, or the like.

Furthermore, the measurement unit 142 may include a sensor for measuring distance to an object around the information processing device 100. For example, the measurement unit 142 may be a Light Detection and Ranging, Laser Imaging Detection and Ranging (LiDAR) that reads a three-dimensional structure of a surrounding environment of the information processing device 100. The LiDAR senses distance to or relative velocity to a peripheral object by irradiating the surrounding object with a laser beam such as an infrared laser and measuring time required for the laser beam to reflect and return. Furthermore, the measurement unit 142 may be a distance measurement system using a millimeter wave radar. Furthermore, the measurement unit 142 may include a depth sensor for acquiring depth data.

Furthermore, the measurement unit 142 may include a microphone that collects sound around the information processing device 100, an illuminance sensor that senses illuminance around the information processing device 100, a humidity sensor that senses humidity around the information processing device 100, a geomagnetic sensor that senses a magnetic field at a position of the information processing device 100, or the like.

The input unit 150 is a processing unit for receiving various operations from a user, or the like, who utilizes the information processing device 100. The input unit 150 receives input of various pieces of information via, for example, a keyboard, a touch panel, or the like.

The output unit 160 is a processing unit for outputting various pieces of information. The output unit 160 is, for example, a display, a speaker, or the like. For example, the output unit 160 displays an image captured by the imaging unit 141, or displays as a rectangle an object detected in the image.

The control unit 130 is implemented by a program (for example, an information processing program according to the present disclosure) stored in the information processing device 100, the program being executed by, for example, a central processing unit (CPU), a micro processing unit (MPU), a graphics processing unit (GPU), or the like, with a random access memory (RAM), or the like, used as a work area. Furthermore, the control unit 130 is a controller, and may be implemented by, for example, an integrated circuit such as an application specific integrated circuit (ASIC), or a field programmable gate array (FPGA).

Figure 5:
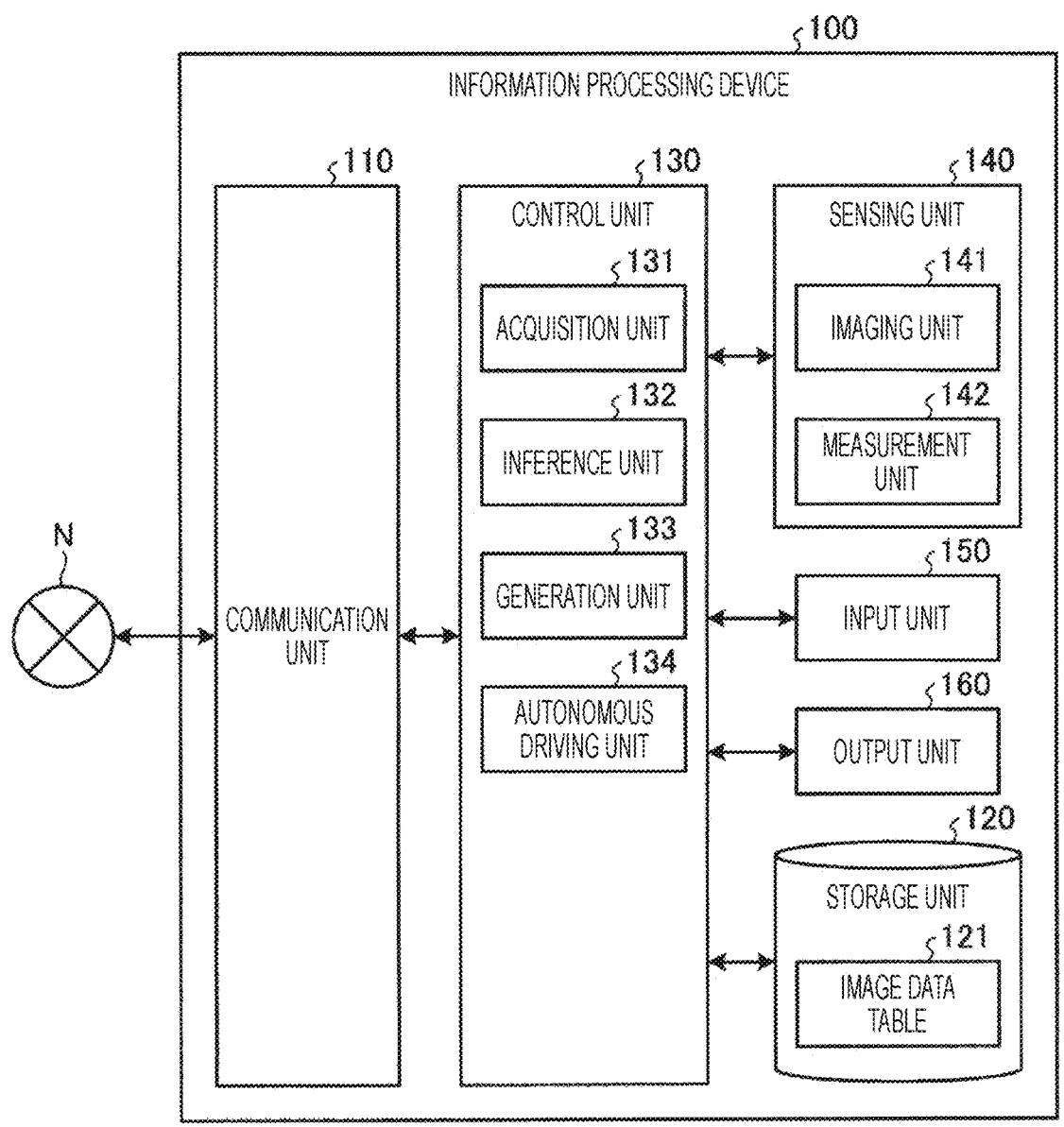
FIG. 5 is a diagram illustrating a configuration example of an information processing device according to the embodiment of the present disclosure.

As illustrated in FIG. 5, the control unit 130 has an acquisition unit 131, an inference unit 132, a generation unit 133, and an autonomous driving unit 134, and implements or executes a function or operation of information processing described below. Note that an internal configuration of the control unit 130 is not limited to the configuration illustrated in FIG. 5, and may be another configuration as long as the configuration enables the information processing described later.

The acquisition unit 131 acquires various pieces of information. For example, the acquisition unit 131 acquires an image taken by a sensor (imaging unit 141) included in a traveling object on which the information processing device 100 is mounted.

For example, as a sensor, the acquisition unit 131 acquires an image taken by a stereo camera. In this case, the acquisition unit 131 acquires distance to the object, the distance having been measured by, for example, stereo distance measurement. Note that, as a sensor, the acquisition unit 131 may acquire an image taken by a monocular camera. In this case, the acquisition unit 131 acquires distance to the object, the distance having been measured by, for example, a distance measurement sensor (measurement unit 142) that uses laser, or the like. That is, the acquisition unit 131 may acquire, as a taken image, not only a visible image but also image data including depth data.

The acquisition unit 131 stores the acquired information in the storage unit 120 as appropriate. Furthermore, the acquisition unit 131 may acquire information required for processing from the storage unit 120 as appropriate. Furthermore, the acquisition unit 131 may acquire information required for processing via the sensing unit 140 or the input unit 150, or may acquire information from an external device via the network N. That is, the acquisition unit 131 does not necessarily acquire an image taken by the information processing device 100, but may acquire an image taken by the external device, an image previously stored in the storage unit 120, or the like.

On the basis of a result of checking a taken image acquired by the acquisition unit 131 against a plurality of images taken in the past, the inference unit 132 infers an image (image for checking), which is an image taken in the past at a position corresponding to an image to be taken at a next timing of the taken image.

Furthermore, after a restored image is generated by the generation unit 133 described later, the inference unit 132 further checks the restored image against a plurality of images taken in the past to infer an image taken in the past at a position corresponding to an image to be taken at a next timing of the restored image. That is, the inference unit 132 repeatedly checks restored images against the images taken in the past while autonomous driving continues, and sequentially infers images for checking for performing environmental deterioration compensation.

For example, the inference unit 132 infers an image for checking corresponding to an image taken by a traveling object including a sensor. That is, the inference unit 132 infers an image for checking for each of images continuously taken according to movement of the traveling object.

Specifically, the inference unit 132 infers an image for checking from a plurality of images taken in the past on the basis of traveling speed of the traveling object that has taken the taken image. For example, as illustrated in FIG. 2, from a relation between traveling speed of when a moving image was taken in the past and traveling speed of a present time, the inference unit 132 infers an image for checking corresponding to an image to be newly taken next.

Alternatively, on the basis of a position information of the traveling object, the inference unit 132 may infer an image for checking which is an image taken in the past at a position corresponding to an image to be newly taken. For example, the inference unit 132 compares GPS data of when an image was taken in the past with GPS data at a present time, and performs inference by using an image taken in the past as an image for checking at a position at which the traveling object is expected to take an image next.

Note that the inference unit 132 does not necessarily have to infer only one image as an image for checking, and may infer a plurality of images as candidate images for images for checking. For example, in a case where the inference unit 132 infers an image for checking on the basis of traveling speed or position information, depending on accuracy of the traveling speed or the position information, it may be difficult to infer only one image to be the image for checking. In this case, the inference unit 132 may extract a plurality of candidate images on the basis of traveling speed and position information, and infer a candidate image from the extracted images. Alternatively, at a timing of performing environmental deterioration compensation, the generation unit 133, which will be described later, may further extract, from among the plurality of extracted candidate images, an image most corresponding to the newly taken image, and perform environmental deterioration compensation on the basis of the one extracted image.

Figure 7:
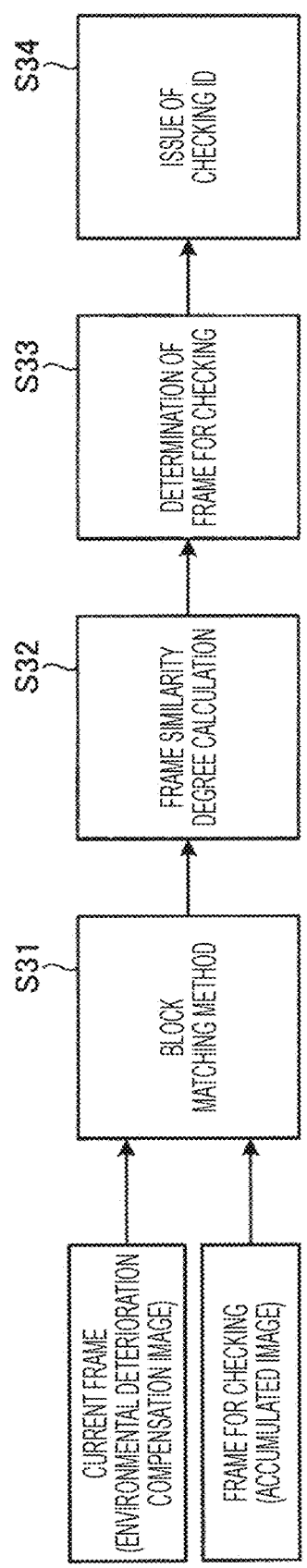
FIG. 7 is a diagram (1) describing checking processing according to the embodiment of the present disclosure.

Here, details of checking processing executed by the inference unit 132 will be described by using FIG. 7. FIG. 7 is a diagram (1) describing checking processing according to the embodiment of the present disclosure.

The inference unit 132 acquires a restored image (environmental deterioration compensation image) generated by the generation unit 133 as a current frame. Furthermore, the inference unit 132 acquires a frame for checking from the accumulated images. Note that the frame for checking may include a plurality of frames, which are, on the basis of GPS data, or the like, expected to have been taken at a position close to the current frame.

The inference unit 132 calculates difference between the current frame and the frame for checking by using a block matching method (step S31). Then, from an error (difference) for each block, the inference unit 132 calculates a degree of similarity between the frames. For example, the inference unit 132 compares the current frame with the frame for checking by using the following Formula (1).

[Mathematical Formula 1]

$$E = \sum_{Block\ A} |C_i - R_i| \quad (1)$$

$(C_i \in \text{Block } A, R_i \in \text{Block } B)$

In the above-described Formula (1), "E" represents an error (difference) between the current frame and the frame for checking. "Block" represents a comparison target part of the image. For example, Block is a rectangle of several pixels×several pixels. "C" and "R" represent color information for each pixel. That is, according to Formula (1), it is possible to output an error evaluation value such as how much the current frame differs from the frame for checking. On the basis of this, the inference unit 132 calculates a degree of similarity between the frames (step S32).

Then, the inference unit 132 determines a frame for checking corresponding to the current frame on the basis of the calculated degree of similarity (step S33). For example, the inference unit 132 determines the frame having a highest degree of similarity among the candidate images to be the frame for checking. Then, the inference unit 132 issues a checking ID as information for identifying the determined frame for checking (step S34).

Note that a method for calculating a degree of similarity of frames is not limited to the above-described method, and various known techniques may be utilized.

Figure 8:
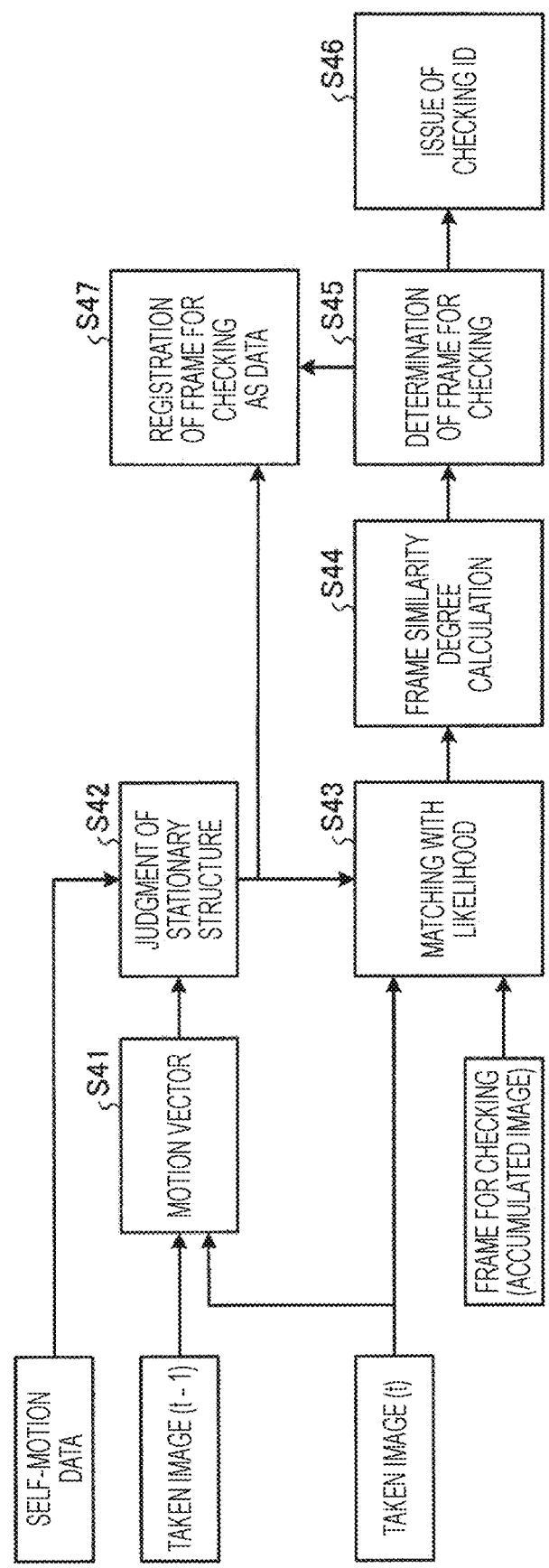
FIG. 8 is a diagram (2) describing the checking processing according to the embodiment of the present disclosure.

Next, another example of checking processing executed by the inference unit 132 will be described by using FIG. 8. FIG. 8 is a diagram (2) describing the checking processing according to the embodiment of the present disclosure. In the processing illustrated in FIG. 8, by performing processing for judging a stationary object, such as a structure, included in an image and a moving object in motion in the image, accuracy of checking images accumulated further in the past against an image of a present time can be improved.

In the example illustrated in FIG. 8, the inference unit 132 acquires a taken image (t−1) and self-motion data in addition to a frame for checking and a taken image (t). The taken image (t−1) is an image taken at a timing immediately before the taken image (t).

The inference unit 132 calculates motion vector in the image on the basis of difference between the taken image (t) and the taken image (t−1) (step S41). Then, the inference unit 132 judges a stationary structure in the image on the basis of the calculated motion vector (step S42). With this arrangement, the inference unit 132 can perform processing by distinguishing between a stationary structure and a moving object in the image.

Thereafter, as in a similar manner to step S31 in FIG. 7, the inference unit 132 can perform matching based on likelihood of including a structure when matching the taken image (t) with a frame for checking (step S43). With this arrangement, even if the taken image (t) includes a moving object such as a pedestrian or an animal, the inference unit 132 can reduce influence of the moving object, and therefore, the taken image (t) can be checked against an image taken at the same position in the past with high accuracy.

Subsequently, as in a similar manner to steps S32 and S33 in FIG. 7, the inference unit 132 calculates a degree of similarity of frames (step S44) and determines a frame for checking (step S45). Furthermore, as in a similar manner to step S34 in FIG. 7, the inference unit 132 issues a checking ID (step S46).

Furthermore, the inference unit 132 may newly register the frame for checking as one of accumulated images (step S47). For example, in order to utilize the image inferred as the frame for checking as one of the accumulated images in the future, the inference unit 132 registers the image in the storage unit 120. At this time, the inference unit 132 may acquire information regarding the stationary structure, the information being obtained in step S42, and, on the basis of the information, may accumulate image data obtained by excluding a moving object from the frame for checking. With this arrangement, the inference unit 132 can store, as one of the accumulated images, an image in which influence of the moving object is reduced, and therefore, accuracy of checking and environmental deterioration compensation can be improved in future processing.

Description will be continued returning to FIG. 5. In a case where a new image is acquired, on the basis of the image for checking, the generation unit 133 generates a restored image obtained by correcting the newly acquired image. Note that the generation unit 133 may acquire a new image taken by the information processing device 100, or may acquire an image taken by another imaging device (camera, or the like) via the network N, or the like.

Furthermore, in a case where an image is acquired at the next timing of the restored image, the generation unit 133 corrects, on the basis of the image taken in the past at a position corresponding to an image to be acquired at a next timing of the restored image, the image taken at the next timing of the restored image. That is, the inference unit 132 continues to provide images for performing high-security autonomous driving by repeatedly generating restored images while the autonomous driving continues.

Specifically, the generation unit 133 corrects the newly taken image by performing environmental deterioration compensation on the basis of difference between the newly taken image and the image for checking. Various known techniques may be applied for environmental deterioration compensation.

Figure 9:
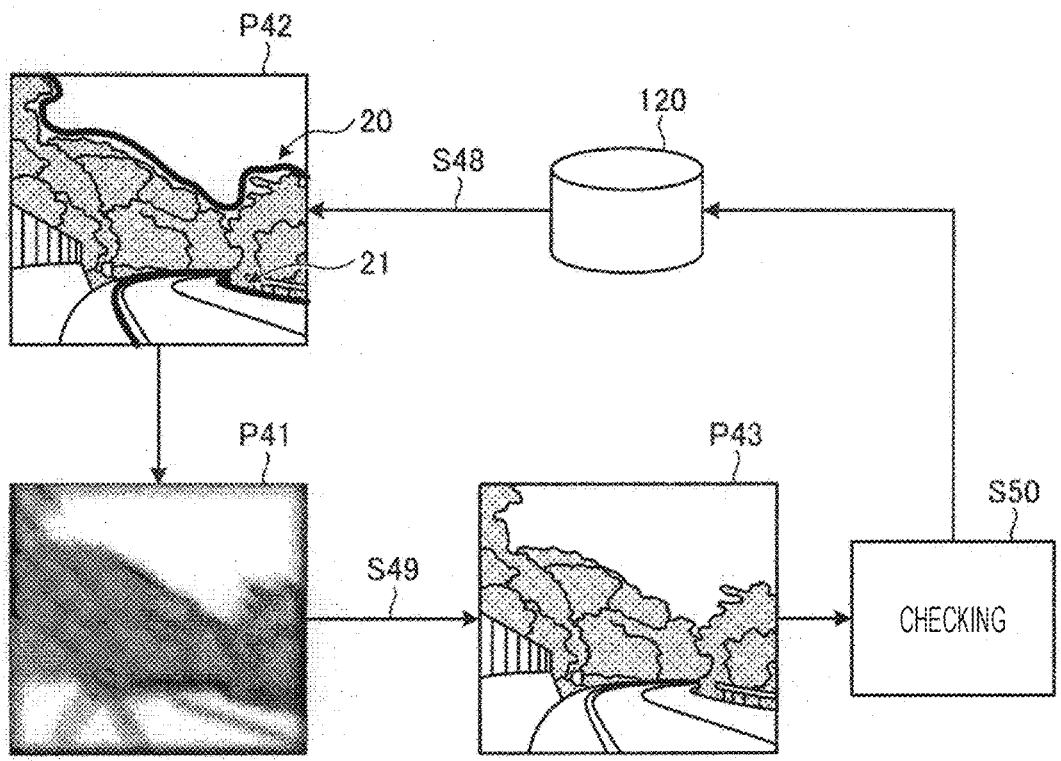
FIG. 9 is a diagram (1) describing generation processing according to the embodiment of the present disclosure.

For example, the generation unit 133 may generate a restored image by correcting a newly taken image on the basis of a boundary of a natural environment included in the image for checking. This point will be described by using FIG. 9. FIG. 9 is a diagram (1) describing generation processing according to the embodiment of the present disclosure.

In the example in FIG. 9, the generation unit 133 acquires an image P41, which is unclear due to influence of fog or mist, or the like, as a newly taken image. Furthermore, from the storage unit 120, the generation unit 133 acquires an image P42 as an image for checking, the image P42 being an image obtained by capturing an image of the same subject as in the image P41 (step S48).

The generation unit 133 analyzes the image P42 and extracts a boundary 20 between the sky and ground, a curve 21 that represents a road, or the like. Then, the generation unit 133 compares and verifies the analyzed image P42 and the image P41, and generates an image P43, which is a restored image (step S49). For example, the generation unit 133 acquires, from the P42, information of a boundary of the sky, a curve representing a road, or the like, which is unclear in the image P41, reflects the acquired information to the image P41, and generates the image P43. With this arrangement, the generation unit 133 can generate the image P43 having a clear boundary between the sky and the road, instead of the image P41 in which the sky and the road are unclear, and therefore, safety of autonomous driving can be improved.

Thereafter, on the basis of the image P43, the inference unit 132 performs checking processing for inferring an image for checking corresponding to an image expected to be taken next (step S50). A next image for checking is selected from the storage unit 120 on the basis of a checking ID issued by the checking processing.

The environmental deterioration compensation may include various different pieces of processing according to a factor that causes environmental deterioration. For example, in a case where transmittance of the image for checking is higher than transmittance of the newly taken image, the generation unit 133 executes, on the basis of the image for checking, haze removal on the newly taken image and generates a restored image.

Figure 10:
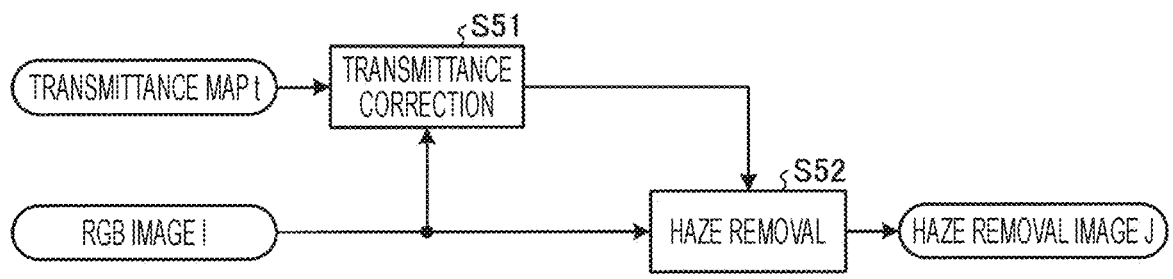
FIG. 10 is a diagram (2) describing the generation processing according to the embodiment of the present disclosure.

This point will be described by using FIG. 10. FIG. 10 is a diagram (2) describing the generation processing according to the embodiment of the present disclosure.

In a case where haze removal is performed, the generation unit 133 generates a transmittance map t representing transmittance in an image, separately from an RGB image I (taken image). Then, the generation unit 133 performs transmittance correction on the RGB image I (step S51). Subsequently, the generation unit 133 performs haze removal on the original RGB image I on the basis of the corrected transmittance (step S52). With this arrangement, the generation unit 133 can generate an image J from which haze is removed.

Furthermore, the generation unit 133 may perform processing for removing not only haze, such as fog or mist, but also a noise component, or the like caused by raindrops, or dirt on a lens. For example, on the basis of motion vector calculated on the basis of the image for checking and images taken before or after the image for checking, the generation unit 133 may execute noise removal on a newly taken image and generate a restored image.

Figure 11:
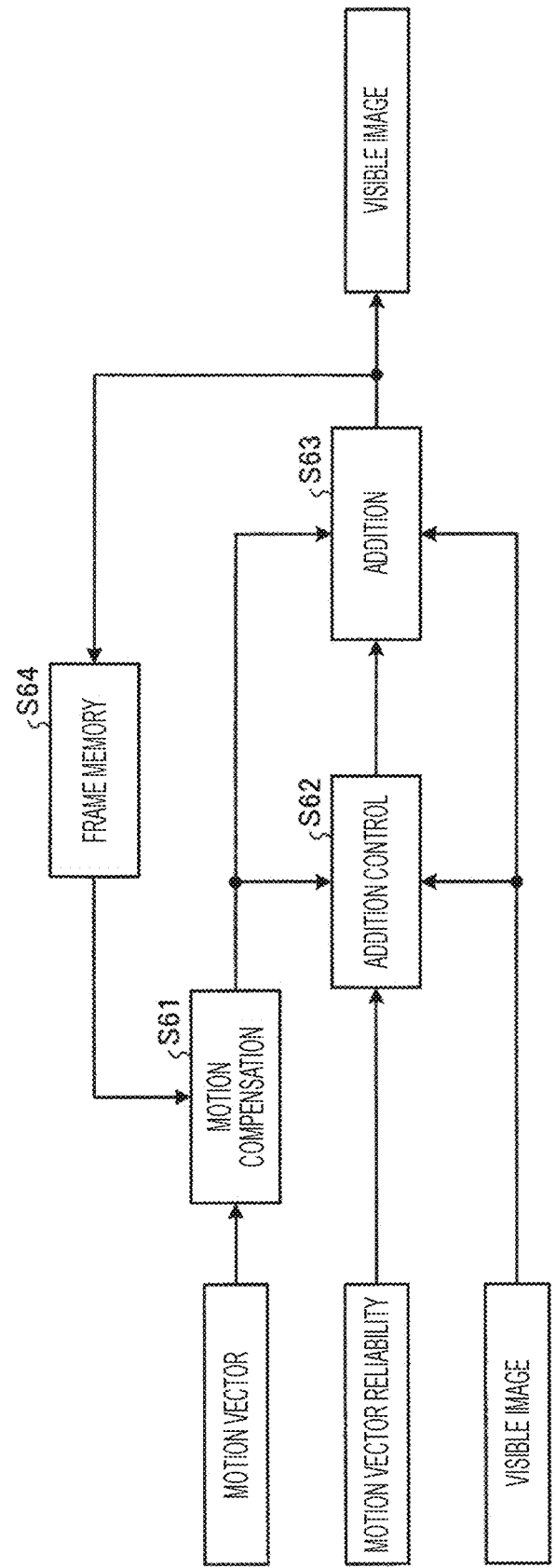
FIG. 11 is a diagram (3) describing the generation processing according to the embodiment of the present disclosure.

This point will be described by using FIG. 11. FIG. 11 is a diagram (3) describing the generation processing according to the embodiment of the present disclosure.

In a case where noise removal is performed, for example, the generation unit 133 extracts a plurality of images from a series of moving images and performs correction processing on the basis of the extracted plurality of images. This is based on a fact that influence of a part including frequent motion (a part that may cause noise) is reduced by adding a plurality of images continuously taken at a predetermined time, and therefore a clear image can be obtained.

First, as illustrated in FIG. 11, the generation unit 133 calculates a motion vector and motion vector reliability from a plurality of images by utilizing a known technique.

The generation unit 133 performs motion compensation on the image on the basis of the motion vector (step S61). Thereafter, the generation unit 133 controls an addition ratio of a past frame to a current frame by using feature values of a noise amount, blur amount, folding amount, motion vector reliability, cyclic history, or the like, in a plurality of images (step S62). Then, on the basis of information regarding motion compensation, the addition ratio, and each information of a visible image, the generation unit 133 adds a plurality of images and obtains a visible image from which influence of noise is removed (step S63). Note that the generation unit 133 may store in the frame memory an image obtained by adding the plurality of images to utilize the image for next processing (step S64).

In this way, by calculating motion vector, or the like, from the image for checking and images taken before or after the image for checking, the generation unit 133 executes noise removal on an image and generates a restored image, on the basis of information regarding a stationary object identified in the image. With this arrangement, the generation unit 133 can perform strong noise removal against environmental deterioration caused by various factors.

Furthermore, the generation unit 133 may judge a stationary structure such as a building by utilizing motion vector, and select an image to be accumulated on the basis of a result of the judgment. For example, the generation unit 133 may select an image including fewer moving objects and accumulate the image in the storage unit 120. In this way, the generation unit 133 compares pixel information of an image for checking and a restored image, and selects which image is to be accumulated in the storage unit 120. For example, the generation unit 133 selects an image having less noise, such as an image having a smaller signal-to-noise ratio or an image having a high contrast in the image, and updates an image accumulated in the image data table 121. With this arrangement, the generation unit 133 can accumulate a clear image less under influence of noise in the storage unit 120 as the processing progresses.

The autonomous driving unit 134 executes processing in a rear stage of the generation unit 133. For example, the autonomous driving unit 134 performs image recognition processing on the restored image generated by the generation unit 133, and controls the autonomous driving by the traveling object. For example, in a case where, as a result of an image recognition processing, a traveling object and an object may collide with each other, or a road surface on which the traveling object travels is obstructed, the autonomous driving unit 134 controls evasive action (steering operation or brake operation) of the traveling object, or alerts the user of the traveling object.

1-3. Information Processing Procedures According to the Embodiment

Figure 12:
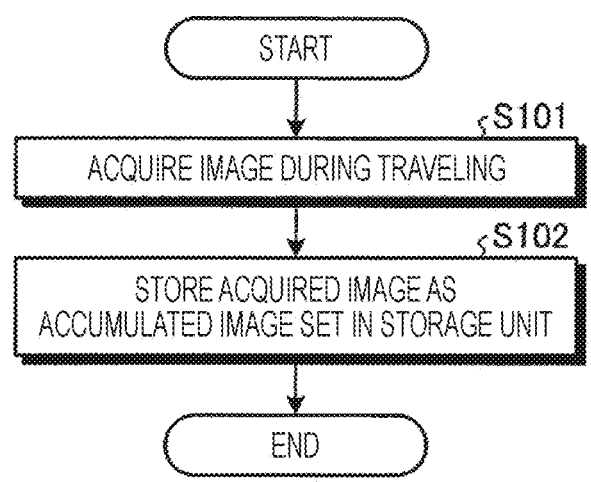
FIG. 12 is a flowchart (1) illustrating a flow of processing according to the embodiment of the present disclosure.
Figure 13:
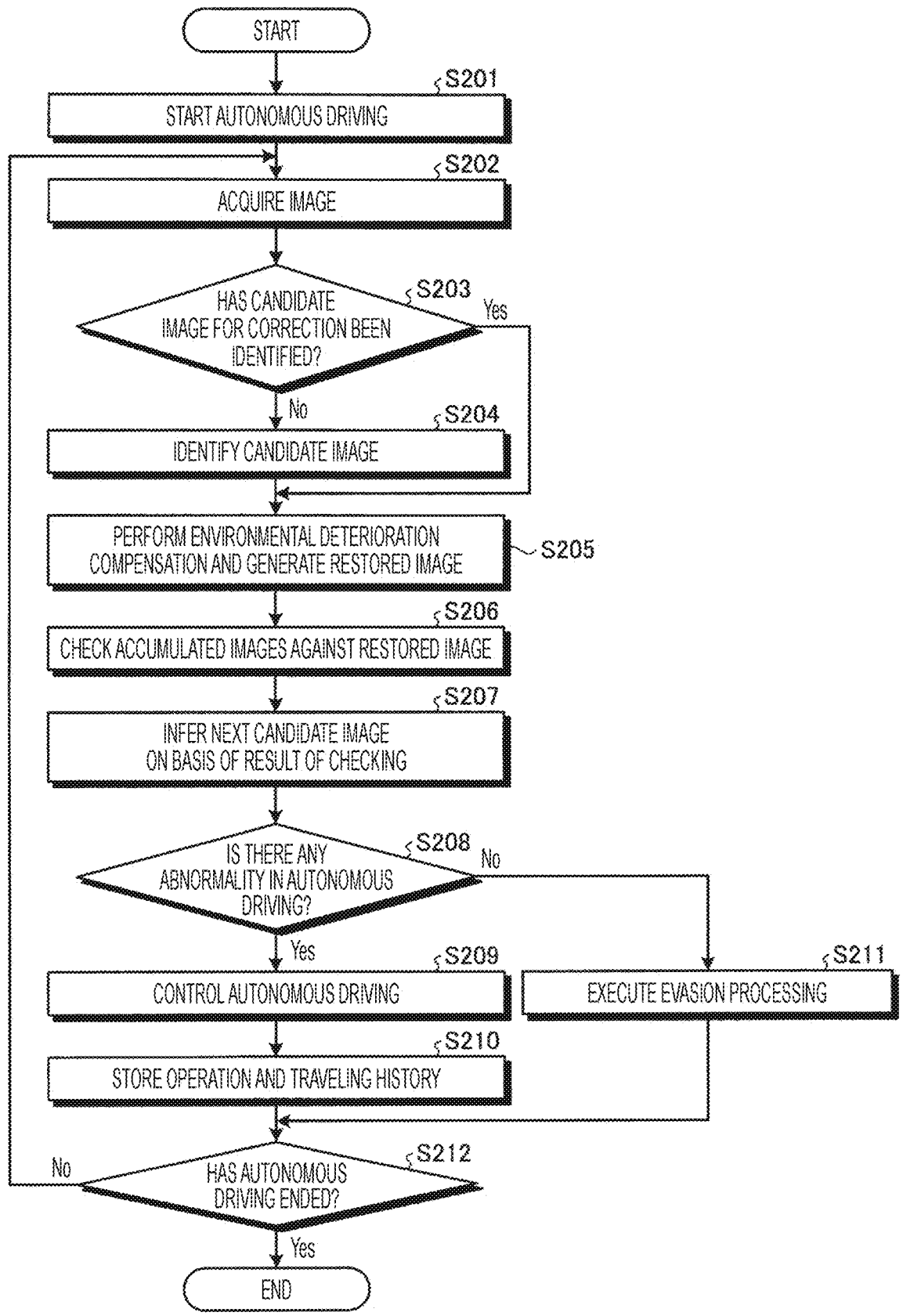
FIG. 13 is a flowchart (2) illustrating a flow of processing according to the embodiment of the present disclosure.

Next, Information processing procedures according to the embodiment will be described by using FIGS. 12 and 13. FIG. 12 is a flowchart (1) illustrating a flow of processing according to the embodiment of the present disclosure.

As illustrated in FIG. 12, during traveling, the information processing device 100 acquires an image via a sensor such as a camera 40 (step S101). Then, the information processing device 100 stores in the storage unit 120 the acquired image as an accumulated image set (step S102).

As illustrated in FIG. 12, by acquiring and accumulating an image during traveling, the information processing device 100 can execute information processing according to the embodiment when traveling the same route next time. For example, the information processing device 100 may record an oncoming lane with a rear camera on a way to a destination, and may execute the information processing according to the embodiment in autonomous driving in a return trip.

Subsequently, FIG. 13 will be described. FIG. 13 is a flowchart (1) illustrating a flow of processing according to the embodiment of the present disclosure.

The information processing device 100 starts autonomous driving according to operation by the user, or the like (step S201). The information processing device 100 acquires an image during traveling by autonomous driving (step S202).

The information processing device 100 judges whether or not a correction image for correcting the acquired image has been identified (step S203). For example, it is assumed that a candidate image is not identified in a first frame when the autonomous driving is started on a certain route. In this way, in a case where a candidate image is not identified (step S203; No), the information processing device 100 identifies a candidate image by using, for example, position information such as GPS data (step S204).

Meanwhile, in a case where a candidate image is identified (step S203; Yes), the information processing device 100 performs environmental deterioration compensation on the basis of the candidate image and generates a restored image (step S205). Note that in a case where there is a plurality of candidate images, the information processing device 100 performs environmental deterioration compensation on the basis of an image for checking selected from among the candidate images.

Thereafter, the information processing device 100 checks the accumulated images against the restored image (step S206). Then, the information processing device 100 infers a next candidate image on the basis of a result of checking (step S207).

Subsequently, the information processing device 100 judges whether or not there is any abnormality in the autonomous driving (step S208). In a case where there is no abnormality (step S208; Yes), the information processing device 100 continues to control the autonomous driving (step S209). Then, the information processing device 100 stores operation and traveling history during the autonomous driving.

Meanwhile, in a case of having judged that there is abnormality in autonomous driving (step S208; No), the information processing device 100 executes evasion processing against the abnormality (step S211).

Thereafter, the information processing device 100 judges whether or not the autonomous driving has ended (step S212). In a case where the autonomous driving has not ended (step S212; No), the information processing device 100 continues processing for acquiring an image (step S202). Meanwhile, in a case where the autonomous driving has ended due to operation by the user, arriving a destination, or the like (step S212; Yes), the information processing device 100 ends a series of processing.

1-4. Modifications According to the Embodiment

The information processing according to the embodiment may be performed in various different forms other than the embodiment described above. Therefore, other embodiments of the information processing device 100 will be described below.

1-4-1. Utilization of Map Data, or the Like

In the embodiment described above, it is illustrated that the information processing device 100 infers, on the basis of traveling speed of a traveling object, or the like, an image for checking corresponding to an image taken at a next timing. Here, the information processing device 100 may infer an image for checking by using not only the traveling speed but also different information.

For example, the information processing device 100 may infer an image for checking on the basis of map data. Generally, a traveling object that autonomously drives includes map data for grasping spatial position of a traveling object. Therefore, the traveling object travels while predicting a future traveling position such as a position where the traveling object travels next, or a position where the moving object makes a turn. On the basis of the map data, the information processing device 100 may judge such a position to be traveled in the future, and, on the judgment result, the information processing device 100 may infer an image for checking corresponding to an image to be taken at a next timing.

1-4-2. Application to Cases Other than Autonomous Driving

The information processing according to the present disclosure may be applied to various cases other than environmental deterioration compensation during autonomous driving. For example, the information processing according to the present disclosure may be applied to environmental deterioration compensation in diagnostic imaging.

For example, under a situation of diagnosing a certain image, there may be a case where image quality of an image of the subject, which has been captured until several seconds ago deteriorates. As an example, in a case where a practitioner uses an electronic scalpel in an operative field, there may be a case where smoke or the like is generated and only an image in which a subject that has been imaged until several seconds ago is blurred, or an image of which transmittance is reduced due to the smoke is to be obtained.

In such a case, the information processing according to the present disclosure can be executed to perform environmental deterioration compensation. Specifically, the information processing device 100 performs environmental deterioration compensation on an image affected by the smoke, on the basis of an image captured until several seconds ago, the image being not affected by the environment. With this arrangement, the information processing device 100 can obtain a clear current image from which influence of the smoke is removed.

2. Other Embodiments

The processing according to each of the above-described embodiments may be performed in various different forms other than the above-described embodiments.

2-1. Configuration of Traveling Object

Although an example in which the information processing device 100 is mounted on a traveling object is illustrated in the embodiment described above, the information processing device 100 may be implemented by an autonomous traveling object (automobile) itself that autonomously drives. In this case, the information processing device 100 may have the following configuration in addition to the configuration illustrated in FIG. 5. Note that each of the units illustrated below may be included in the configuration illustrated in FIG. 5, for example.

For example, the traveling object has an autonomous driving control unit, a detection unit, a self-position estimation unit, a situation analysis unit, a planning unit, and a motion control unit. Furthermore, the traveling object may include an input unit, a data acquisition unit, a vehicle communication unit, an in-vehicle apparatus, an output control unit, an output unit, a drive-system control unit, a drive system, a body-system control unit, a body system, a vehicle storage unit, and an autonomous driving control unit.

The input unit includes a device used by an occupant to input various data, an instruction, or the like. For example, the input unit includes an operation device, or the like, such as a touch panel, a button, a microphone, a switch, or a lever, and an operation device capable of inputting by sound, gesture, or the like, with a method other than manual operation. Furthermore, for example, the input unit may be a remote control device utilizing an infrared ray or another radio wave, or an external connection apparatus such as a mobile apparatus or wearable apparatus corresponding to operation of the information processing device 100. The input unit generates an input signal on the basis of data, an instruction, or the like input by the occupant, and provides the input signal to each of the units of the information processing device 100.

The data acquisition unit includes various sensors, or the like for acquiring data used for processing the traveling object, and provides the acquired data to each units of the traveling object.

For example, the data acquisition unit includes various sensors for detecting a state of an own vehicle, or the like. Specifically, for example, the data acquisition unit includes a gyro sensor, an acceleration sensor, an inertial measurement unit (IMU), or a sensor, or the like that detects an accelerator pedal operation amount, a brake pedal operation amount, a steering wheel steering angle, engine speed, motor speed, a rotational rate of wheels, or the like.

Furthermore, for example, the data acquisition unit includes various sensors for detecting external information of the own vehicle, or the like. Specifically, for example, the data acquisition unit includes an imaging device such as a Time Of Flight (ToF) camera, a stereo camera, a monocular camera, an infrared camera, or another camera. Furthermore, for example, the data acquisition unit includes an environment sensor for detecting weather, a meteorological phenomenon, or the like, and a peripheral information detection sensor for detecting an object around the own vehicle. The environment sensor includes, for example, a raindrop sensor, a fog sensor, a sunshine sensor, a snow sensor, or the like. The peripheral information detection sensor includes, for example, an ultrasonic sensor, a radar, a Light Detection and Ranging, Laser Imaging Detection and Ranging (LiDAR), a sonar, or the like.

Moreover, for example, the data acquisition unit includes various sensors for detecting a current position of the own vehicle, or the like. Specifically, for example, the data acquisition unit includes a global navigation satellite system (GNSS) reception apparatus, or the like that receives a GNSS signal from a GNSS satellite.

Furthermore, for example, the data acquisition unit includes various sensors for detecting in-vehicle information, or the like. Specifically, for example, the data acquisition unit includes an imaging device that captures an image of a driver, a biosensor that detects biological information of the driver, a microphone that collects sound in a vehicle interior, or the like. The biosensor is provided, for example, on a seat surface, a steering wheel, or the like, and detects biological information of an occupant sitting on a seat or of a driver holding the steering wheel.

The vehicle communication unit communicates with an in-vehicle apparatus and various apparatuses, a server, a base station, or the like outside of the vehicle, and transmits data provided from each of the units of the traveling object, or provides received data to each of the units of the traveling object. Note that a communication protocol supported by the vehicle communication unit is not particularly limited, and the vehicle communication unit can also support a plurality of types of communication protocols.

For example, the vehicle communication unit performs wireless communication with an in-vehicle apparatus by a wireless LAN, Bluetooth (registered trademark), near field communication (NFC), a wireless USB (WUSB), or the like. Furthermore, for example, the vehicle communication unit performs wired communication with the in-vehicle apparatus by using a universal serial bus (USB), High-Definition Multimedia Interface (HDMI) (registered trademark), Mobile High-definition Link (MHL), or the like, via a connection terminal (and a cable, if necessary).

Moreover, for example, the vehicle communication unit communicates with an apparatus (for example, an application server or a control server) existing on an external network (for example, the Internet, a cloud network, or a business-specific network) via a base station or an access point. Furthermore, for example, the vehicle communication unit communicates with a terminal existing in vicinity of an own vehicle (for example, a terminal of pedestrian or store, or a Machine Type Communication (MTC) terminal) by using a Peer To Peer (P2P) technology. Moreover, for example, the vehicle communication unit performs V2X communication such as vehicle to vehicle communication, vehicle to infrastructure communication, vehicle to home communication, or vehicle to pedestrian communication. Furthermore, for example, the vehicle communication unit includes a beacon reception unit, receives a radio wave or electromagnetic wave transmitted from a radio station or the like installed on a road, and acquires information of a current position, a traffic congestion, a traffic regulation, required time, or the like.

The in-vehicle apparatus includes, for example, a mobile apparatus or wearable apparatus that an occupant has, an information apparatus carried in or attached to the own vehicle, a navigation device for searching a route to an arbitrary destination, or the like.

The output control unit controls output of various kinds of information to an occupant of the own vehicle or to outside of the vehicle. For example, by generating an output signal including at least one of visual information (for example, image data) or auditory information (for example, sound data) and providing the output signal to the output unit, the output control unit controls output of visual information or auditory information from the output unit. Specifically, for example, the output control unit combines image data captured by different imaging devices of the data acquisition unit to generate a bird's-eye view image, a panoramic image, or the like, and provides the output unit with an output signal including the generated image. Furthermore, for example, the output control unit generates sound data including a warning sound, warning message, or the like, for a danger such as a crash, a contact, or entry into a danger zone, and provides the output unit with an output signal including the generated sound data.

The output unit includes a device capable of outputting visual information or auditory information to an occupant of the own vehicle or outside of the vehicle. For example, the output unit includes a display device, an instrument panel, an audio speaker, headphones, a wearable device such as a spectacle-type display, worn by an occupant, a projector, a lamp, or the like. Other than a device having a normal display, a display device included in the output unit may be, for example, a device that displays visual information in a field of view of a driver, such as a head-up display, a transmissive display, or a device having an augmented reality (AR) display function.

The drive-system control unit controls a drive system by generating various control signals and providing the control signals to the drive system. Furthermore, as necessary, the drive-system control unit provides control signals to each unit other than the drive system, and performs notification of a control state of the drive system, or the like.

The drive system includes various devices related to the drive system of the own vehicle. For example, the drive system includes a drive force generation device for generating drive force of an internal combustion engine, a drive motor, or the like, a drive force transmission mechanism for transmitting drive force to wheels, a steering mechanism that adjusts a steering angle, a braking device that generates braking force, antilock brake system (ABS), electronic stability control (ESC), an electronic power steering device, or the like.

The body-system control unit controls a body system by generating various control signals and providing the control signals to the body system. Furthermore, as necessary, the body system control unit provides control signals to each unit other than the body system, and performs notification of a control state of the body-system control unit, or the like.

The body system includes various body devices mounted on the vehicle body. For example, the body system includes a keyless entry system, a smart key system, a power window device, a power seat, a steering wheel, an air conditioning device, various lamps (for example, headlamps, rear lamps, brake lamps, blinkers, fog lamps, or the like), or the like.

The vehicle storage unit includes, for example, a magnetic storage device, such as a read only memory (ROM), a random access memory (RAM), or a hard disc drive (HDD), a semiconductor storage device, an optical storage device, an optical magnetic storage device, or the like. The vehicle storage unit stores various programs, data, or the like used by each of the units of the traveling object. For example, the vehicle storage unit stores map data of a three-dimensional high-precision map such as a dynamic map, a global map covering wide area and having low precision as compared to the high-precision map, a local map including peripheral information of the own vehicle, or the like.

The autonomous driving control unit performs control related to autonomous driving such as autonomous traveling or drive support. Specifically, for example, the autonomous driving control unit performs coordination control for a purpose of implementation of a function of an advanced driver assistance system (ADAS) including crash avoidance or impact mitigation of the own vehicle, following travel based on an inter-vehicle distance, vehicle speed maintenance traveling, crash warning of an own vehicle, a lane deviation warning of the own vehicle, or the like. Furthermore, for example, the autonomous driving control unit performs coordination control for a purpose of autonomous driving or the like that is autonomous traveling without depending on operation by the driver. The autonomous driving control unit includes the detection unit, the self-position estimation unit, the situation analysis unit, the planning unit, and the motion control unit.

The detection unit detects various kinds of information necessary for controlling autonomous driving. The detection unit includes an outside information detection unit, an in-vehicle information detection unit, and a vehicle state detection unit.

The outside information detection unit performs detection processing of information outside of the own vehicle on the basis of data or a signal from each of the units of the traveling object. For example, the outside information detection unit performs detection processing or recognition processing of an object around the own vehicle, tracking processing, and detection processing for a distance to the object. Objects to be detected include, for example, a vehicle, a human, an obstacle, a structure, a road, a traffic light, a traffic sign, a road marking, and the like. Furthermore, for example, the outside information detection unit performs detection processing of environment around the own vehicle. Surrounding environment to be detected includes, for example, weather, temperature, humidity, brightness, a road surface condition, and the like. The outside information detection unit provides data indicating a result of detection processing to the self-position estimation unit, a map analysis unit, traffic rule recognition unit, or situation recognition unit of the situation analysis unit, an emergency situation avoidance unit of the motion control unit, or the like.

The in-vehicle information detection unit performs detection processing of in-vehicle information on the basis of data or a signal from each of the units of the traveling object. For example, the in-vehicle information detection unit performs driver authentication processing, driver recognition processing, driver state detection processing, occupant detection processing, in-vehicle environment detection processing, or the like. States of the driver to be detected include, for example, a physical condition, an arousal level, a level of concentration, a level of fatigue, a direction of a line of sight, and the like. In-vehicle environment to be detected includes, for example, temperature, humidity, brightness, odor, and the like. The in-vehicle information detection unit provides data indicating a result of detection processing to the situation recognition unit of the situation analysis unit, the emergency situation avoidance unit of the motion control unit, or the like.

The vehicle state detection unit performs detection processing of a state of the own vehicle on the basis of data or a signal from each of the units of the traveling object. States of the own vehicle to be detected include, for example, speed, acceleration, a steering angle, presence or absence, or content of abnormality, a driving operation state, a position or inclination of a power seat, a state of a door lock, a state of another vehicle-mounted apparatus, and the like. The vehicle state detection unit provides data indicating a result of detection processing to the situation recognition unit of the situation analysis unit, the emergency situation avoidance unit of the motion control unit, or the like.

The self-position estimation unit performs processing for estimating a position, orientation, or the like of the own vehicle on the basis of data or a signal from each of the units of the traveling object, such as the outside information detection unit or the situation recognition unit of the situation analysis unit. Furthermore, the self-position estimation unit generates a local map used for self-position estimation (hereinafter, referred to as a self-position estimation map), as necessary. The self-position estimation map is, for example, a high-precision map using a technique such as simultaneous localization and mapping (SLAM). The self-position estimation unit provides data indicating a result of the estimation processing to the map analysis unit, traffic rule recognition unit, or situation recognition unit of the situation analysis unit, or the like. Furthermore, the self-position estimation unit stores the self-position estimation map in the vehicle storage unit.

The situation analysis unit performs processing for analyzing a situation of the own vehicle or surroundings. The situation analysis unit includes the map analysis unit, the traffic rule recognition unit, the situation recognition unit, and a situation prediction unit.

The map analysis unit performs processing for analyzing various maps stored in the vehicle storage unit by using data or a signal from each of the units of the traveling object, such as the self-position estimation unit or the outside information detection unit, as necessary, and constructs a map including information necessary for processing for autonomous driving. The map analysis unit provides the constructed map to the traffic rule recognition unit, the situation recognition unit, the situation prediction unit, a route planning unit, action planning unit, or motion planning unit of the planning unit, or the like.

The traffic rule recognition unit performs processing for recognition of a traffic rules around the own vehicle on the basis of data or a signal from each of the units of the traveling object, such as the self-position estimation unit, the outside information detection unit, or the map analysis unit. By this recognition processing, for example, a position or state of a traffic signal around the own vehicle, content of a traffic regulation around the own vehicle, a drivable lane, or the like can be recognized. The traffic rule recognition unit provides data indicating a result of recognition processing to the situation prediction unit, or the like.

The situation recognition unit performs processing for recognition of a situation related to the own vehicle on the basis of data or a signal from each of the units of the traveling object, such as the self-position estimation unit, the outside information detection unit, the in-vehicle information detection unit, the vehicle state detection unit, or the map analysis unit. For example, the situation recognition unit performs processing for recognition of a situation of the own vehicle, a situation around the own vehicle, a situation of a driver of the own vehicle, or the like. Furthermore, the situation recognition unit generates a local map used for recognizing a situation around the own vehicle (hereinafter, referred to as a situation recognition map), as necessary. The situation recognition map is, for example, an occupancy grid map.

Situations of the own vehicle to be recognized include, for example, a position, orientation, motion (for example, speed, acceleration, moving direction, or the like) of the own vehicle, presence or absence, or content of abnormality, and the like. Situations of surroundings of the own vehicle to be recognized include, for example, a type or position of a surrounding stationary object, a type, position, or motion (for example, speed, acceleration, moving direction, or the like) of a surrounding moving object, a configuration of a surrounding road, a condition of a surface of the road, weather, temperature, humidity, or brightness of surroundings, and the like. States of the driver to be recognized include, for example, a physical condition, an arousal level, a level of concentration, a level of fatigue, movement of a line of sight, driving operation, and the like.

The situation recognition unit provides data indicating a result of recognition processing (including a situation recognition map, as necessary) to the self-position estimation unit, the situation prediction unit, or the like. Furthermore, the situation recognition unit stores a situation recognition map in the vehicle storage unit.

The situation prediction unit performs processing for predicting a situation related to the own vehicle on the basis of data or a signal from each of the units of the traveling object, such as the map analysis unit, the traffic rule recognition unit, or the situation recognition unit. For example, the situation prediction unit performs processing for prediction of a situation of the own vehicle, a surrounding situation of the own vehicle, a situation of a driver, or the like.

Situations of the own vehicle to be predicted include, for example, behavior of the own vehicle, an occurrence of abnormality, a travelable distance, and the like. Situation of surroundings of the own vehicle to be predicted include, for example, behavior of a moving object around the own vehicle, a change in a state of a signal, an environmental change such as weather, and the like. Situations of the driver to be predicted include, for example, behavior or physical condition of the driver, and the like.

The situation prediction unit provides data indicating a result of prediction processing to the route planning unit, action planning unit, or motion planning unit of the planning unit, or the like, along with data from the traffic rule recognition unit and the situation recognition unit.

The route planning unit plans a route to a destination on the basis of data or a signal from each of the units of the traveling object, such as the map analysis unit or the situation prediction unit. For example, the route planning unit sets a route from a current position to a specified destination on the basis of a global map. Furthermore, for example, the route planning unit changes a route as appropriate, on the basis of a situation of a traffic congestion, accident, traffic regulation, construction, or the like, or a condition of the driver, or the like. The route planning unit provides data indicating a planned route to the action planning unit, or the like.

The action planning unit plans action of the own vehicle to safely travel on a route planned by the route planning unit within a planned time on the basis of data or a signal from each of the units of the traveling object, such as the map analysis unit or the situation prediction unit. For example, the action planning unit plans starting, stopping, a traveling direction (for example, a forward motion, a rearward motion, a left turn, a right turn, a change in direction, or the like), a driving lane, traveling speed, overtaking, or the like. The action planning unit provides data indicating a planned action of the own vehicle to the motion planning unit, or the like.

The motion planning unit plans motion of the own vehicle to achieve action planned by the action planning unit on the basis of data or a signal from each of the units of the traveling object, such as the map analysis unit or the situation prediction unit. For example, the motion planning unit plans acceleration, deceleration, traveling track, or the like. The motion planning unit provides data indicating a planned motion of the own vehicle to an acceleration/deceleration control unit or a direction control unit of the motion control unit, or the like.

The motion control unit controls motion of the own vehicle. The motion control unit includes the emergency situation avoidance unit, the acceleration/deceleration control unit, and the direction control unit.

The emergency situation avoidance unit performs processing for detection of an emergency situation such as a crash, a contact, entry into a danger zone, abnormally of a driver, or abnormality of the vehicle, on the basis of a result of detection by the outside information detection unit, the in-vehicle information detection unit, or the vehicle state detection unit. In a case where an emergency situation is detected, the emergency situation avoidance unit plans motion of the own vehicle to avoid the emergency situation such as a sudden stop or a sharp turn. The emergency situation avoidance unit provides data indicating a planned motion of the own vehicle to an acceleration/deceleration control unit or a direction control unit, or the like.

The acceleration/deceleration control unit performs acceleration/deceleration control for achieving motion of the own vehicle planned by the motion planning unit or the emergency situation avoidance unit. For example, the acceleration/deceleration control unit calculates a control target value for the drive force generation device or braking device for achieving a planned acceleration, deceleration, or sudden stop, and provides the drive-system control unit with a control command indicating a calculated control target value.

The direction control unit performs direction control for achieving motion of the own vehicle planned by the motion planning unit or the emergency situation avoidance unit. For example, the direction control unit calculates a control target value for a steering mechanism for achieving a traveling track or sharp turn planned by the motion planning unit or the emergency situation avoidance unit, and provides the drive-system control unit with a control command indicating a calculated control target value.

2-2. Others

Of the processing described in each of the embodiments described above, all or a part of the processing described as being automatically performed can be performed manually, or all or a part of the processing described as being manually performed can be automatically performed by a known method. In addition, the processing procedures, specific names, and information including various data and parameters described in the above document or in the drawings can be arbitrarily changed unless otherwise identified. For example, the various pieces of information illustrated in each of the drawings are not limited to the illustrated information.

Furthermore, each component of each of the illustrated devices is a functional concept, and does not necessarily have to be physically configured as illustrated in the drawings. That is, the specific form of distribution or integration of each of the devices is not limited to the one illustrated in the drawings, and all or a part of the device can be functionally or physically distributed or integrated in any units according to various loads, usage conditions, or the like.

Furthermore, the above-described embodiments and modifications can be appropriately combined as long as content of the processing does not contradict each other. Furthermore, although an automobile is taken as an example of a traveling object in the embodiments described above, information processing according to the present disclosure can be applied to a traveling object other than an automobile. For example, the traveling object may be a small vehicle such as an automatic two-wheeled vehicle or an automatic three-wheeled vehicle, a large vehicle such as a bus or a truck, or an autonomous traveling object such as a robot or a drone. Furthermore, an information processing device 100 is not necessarily integrated with the traveling object, and may be a cloud server or the like that acquires information from the traveling object via a network N and determines, on the basis of the acquired information, an area to be removed.

Furthermore, the effects described herein are only examples, and the effects of the present technology are not limited to these effects. Additional effects may also be obtained.

3. Effects of Information Processing Device According to the Present Disclosure As described above, the information processing device (the information processing device 100 in the embodiments) according to the present disclosure has an inference unit (the inference unit 132 in the embodiments) and a generation unit (the generation unit 133 in the embodiments). On the basis of a result of checking a first image (a taken image in the embodiments) against a plurality of images taken in the past, the inference unit infers, a third image (an image for checking or candidate image in the embodiments) that is an image taken in the past at a position corresponding to a second image (a taken image to be taken next to a taken image in the embodiments) to be taken at a next timing of the first image. The generation unit infers a fourth image (a restored image in the embodiments) that is an image obtained by correcting the second image on the basis of the third image in a case where the second image is acquired.

In this way, the information processing device according to the present disclosure infers an image to be checked against an image to be acquired next, and corrects, on the basis of the inferred image, an image (second image) to be acquired next. With this arrangement, the information processing device can obtain an image not affected by an environmental change.

Furthermore, after the fourth image is generated, the inference unit checks the fourth image against a plurality of images taken in the past to infer an image taken in the past at a position corresponding to an image to be taken at a next timing of the fourth image. In a case where an image is acquired at the next timing of the fourth image, the generation unit corrects, on the basis of the image taken in the past at a position corresponding to an image to be acquired at a next timing of the fourth image, the image taken at the next timing of the fourth image. With this arrangement, the information processing device can continuously acquire less deteriorated images, and therefore can achieve stable acquisition of images in continuous processing such as autonomous driving.

Furthermore, the inference unit infers a third image corresponding to a second image taken by a traveling object including a sensor. With this arrangement, the information processing device can obtain an image not affected by an environmental change in processing, such as autonomous driving, which utilizes an image taken by a traveling object.

Furthermore, the inference unit infers a third image from a plurality of images taken in the past on the basis of traveling speed of the traveling object that takes the first image. With this arrangement, the information processing device can infer the third image corresponding to an image to be taken next with high accuracy.

Furthermore, on the basis of position information of the traveling object, the inference unit infers a third image taken in the past at a position corresponding to the second image. With this arrangement, the information processing device can infer an image corresponding to an image of a present time from images taken in the past even in a case where a checking result cannot be obtained.

Furthermore, the generation unit generates the fourth image by correcting the second image on the basis of a boundary of natural environment included in the third image. With this arrangement, the information processing device can obtain a fourth image useful in processing, such as autonomous driving, which utilizes a boundary.

Furthermore, in a case where transmittance of the third image is higher than transmittance of the second image, the generation unit generates the fourth image by executing haze removal on the second image on the basis of the third image. With this arrangement, the information processing device can obtain a clear fourth image from which influence of fog or mist is removed, and therefore can enhance safety of processing in autonomous driving, or the like.

Furthermore, the generation unit generates the fourth image by executing noise removal on the second image on the basis of motion vector calculated on the basis of the third image and an image taken before or after the third image. With this arrangement, the information processing device can obtain a clear fourth image from which noise generated by influence of light amount due to backlight or nighttime or noise generated by dirt on a lens is removed, and therefore can enhance safety of processing in autonomous driving, or the like.

Furthermore, the generation unit generates the fourth image by executing noise removal on the second image on the basis of information regarding a stationary object identified on the basis of the third image and an image taken before or after the third image. With this arrangement, the information processing device can obtain a fourth image by removing influence of a moving object from a taken image, and therefore can enhance safety of processing in autonomous driving, or the like.

Furthermore, the generation unit compares pixel information of a third image and a fourth image, and selects which image is to be accumulated in the storage unit. With this arrangement, the information processing device can accumulate clearer images in the storage unit, and therefore can enhance an effect of later environmental deterioration compensation processing.

4. Hardware Configuration

Figure 14:
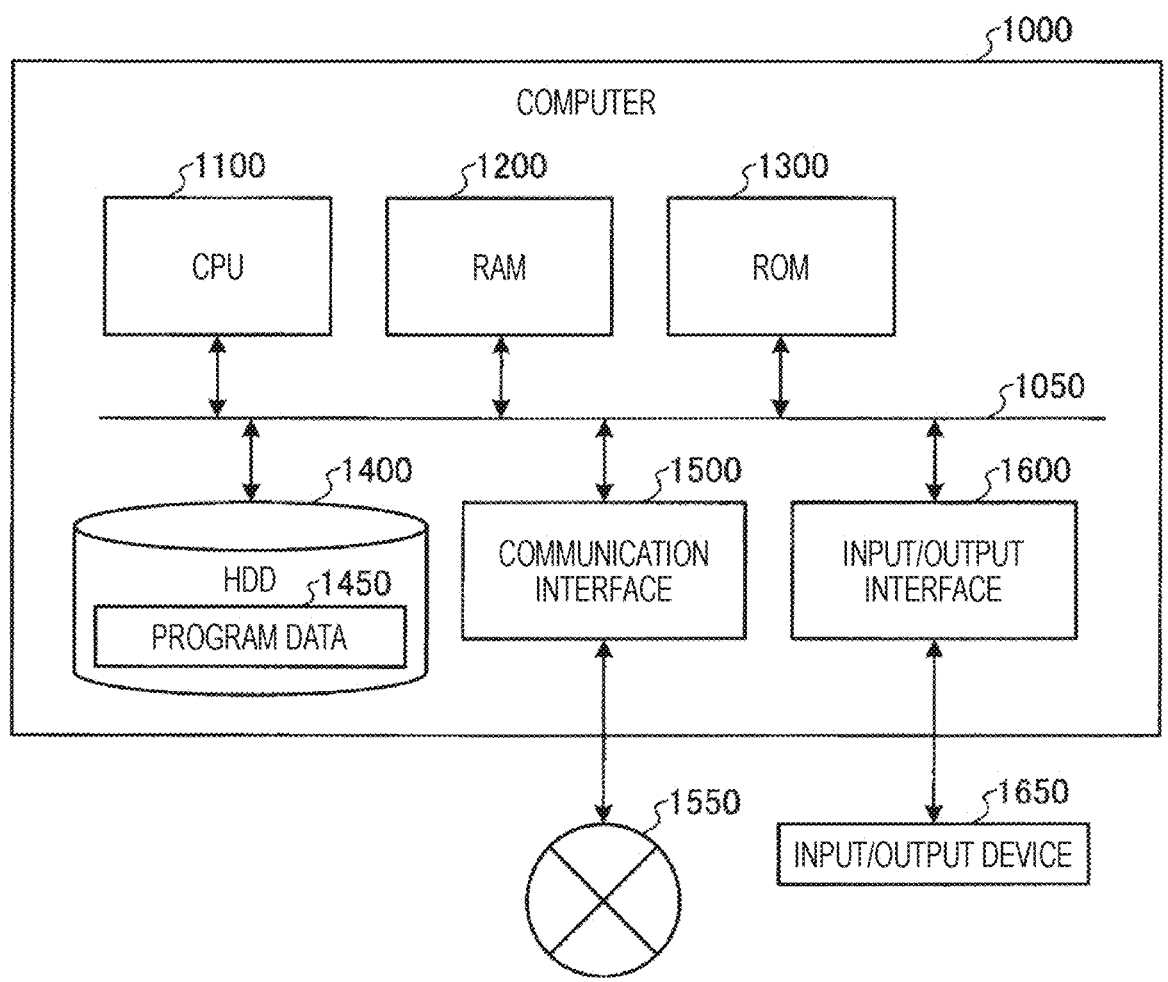
FIG. 14 is a hardware configuration diagram illustrating an example of a computer that implements a function of the information processing device.

An information apparatus such as the information processing device 100 according to each of the above-described embodiments is implemented by, for example, a computer 1000 having a configuration as illustrated in FIG. 14. Description will be given below taking the information processing device 100 according to an embodiment as an example. FIG. 14 is a hardware configuration diagram illustrating an example of the computer 1000 that implements a function of the information processing device 100. The computer 1000 has a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 loads a program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 is started, a program that depends on hardware of the computer 1000, or the like.

The HDD 1400 is a computer-readable recording medium that nontemporarily records a program executed by the CPU 1100, data used by the program, or the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, via the communication interface 1500, the CPU 1100 receives data from another apparatus or transmits data generated by the CPU 1100 to another apparatus.

The input/output interface 1600 is an interface for connecting an input/output device 1650 and the computer 1000. For example, the CPU 1100 receives data from an input device such as a keyboard or mouse via the input/output interface 1600. Furthermore, via the input/output interface 1600, the CPU 1100 transmits data to an output device such as a display, a speaker, or a printer. Furthermore, the input/output interface 1600 may function as a media interface for reading a program or the like recorded on a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device 100 according to the embodiment, the CPU 1100 of the computer 1000 implements a function of the control unit 130 or the like, by executing an information processing program loaded into the RAM 1200. Furthermore, the HDD 1400 stores the information processing program according to the present disclosure or data in the storage unit 120. Note that, although the CPU 1100 reads the program data 1450 from the HDD 1400 and executes the program data 1450, as another example, these programs may be acquired from another device via the external network 1550.

Note that the present technology can have the following configurations.

(1)

An information processing device including an inference unit that infers, on the basis of a result of checking a first image against a plurality of images taken in the past, a third image that is an image taken in the past at a position corresponding to a second image to be taken at a next timing of the first image, and a generation unit that generates a fourth image that is an image obtained by correcting the second image on the basis of the third image in a case where the second image is acquired.

(2)

The information processing device according to (1), in which the inference unit checks, after the fourth image is generated, the fourth image against a plurality of images taken in the past and infers an image taken in the past at a position corresponding to an image to be taken at a next timing of the fourth image, and, in a case where an image is acquired at the next timing of the fourth image, the generation unit corrects, on the basis of the image taken in the past at a position corresponding to the image to be taken at the next timing of the fourth image, an image acquired at the next timing of the fourth image.

(3)

The information processing device according to (1) or (2), in which the inference unit infers the third image corresponding to the second image taken by a traveling object equipped with a sensor.

(4)

The information processing device according to (3)

in which, on the basis of traveling speed of the traveling object that has taken the first image, the inference unit infers the third image from a plurality of images taken in the past.

(5)

The information processing device according to (3) or (4), in which, on the basis of position information of the traveling object, the inference unit infers a third image that is an image taken in the past at a position corresponding to the second image.

(6)

The information processing device according to any one of (1) to (5),
in which the generation unit generates the fourth image by correcting the second image on the basis of a boundary of natural environment included in the third image.

(7)

The information processing device according to any one of (1) to (6),
in which, in a case where transmittance of the third image is higher than transmittance of the second image, the generation unit generates the fourth image by executing haze removal on the second image on the basis of the third image.

(8)

The information processing device according to any one of (1) to (7),
in which the generation unit generates the fourth image by executing noise removal on the second image on the basis of motion vector calculated on the basis of the third image and an image taken before or after the third image.

(9)

The information processing device according to any one of (1) to (8),
in which the generation unit generates the fourth image by executing noise removal on the second image on the basis of information regarding a stationary object identified on the basis of the third image and an image taken before or after the third image.

(10)

The information processing device according to any one of (1) to (9),
in which the generation unit compares pixel information of the third image and of the fourth image, and selects which image is to be accumulated in a storage unit.

(11)

An information processing method including, by a computer
inferring, on the basis of a result of checking a first image against a plurality of images taken in the past, a third image that is an image taken in the past at a position corresponding to a second image to be taken at a next timing of the first image, and
generating a fourth image that is an image obtained by correcting the second image on the basis of the third image in a case where the second image is acquired.

(12)

An information processing program for causing a computer to function as
an inference unit that infers, on the basis of a result of checking a first image against a plurality of images taken in the past, a third image that is an image taken in the past at a position corresponding to a second image to be taken at a next timing of the first image, and
a generation unit that generates a fourth image that is an image obtained by correcting the second image on the basis of the third image in a case where the second image is acquired.

REFERENCE SIGNS LIST

100 Information processing device
110 Communication unit
120 Storage unit
130 Control unit
131 Acquisition unit
132 Inference unit
133 Generation unit
134 Autonomous driving unit
140 Sensing unit
141 Imaging unit
142 Measurement unit
150 Input unit
160 Output unit

The invention claimed is:

1. An information processing device comprising:
an inference unit configured to infer, on a basis of a result of checking a first image against a plurality of images taken in a past, a third image that is an image taken in a past at a position corresponding to a second image to be taken at a next timing of the first image;
a generation unit configured to generate a fourth image that is an image obtained by correcting, on a basis of the third image in a case where the second image is acquired, the second image by performing environmental deterioration compensation to reduce environmental influence degrading a quality of the second image when taken; and
an autonomous driving unit configured to
perform image recognition processing on the fourth image, and
control autonomous driving by a travelling object or alert a user of the travelling object based on a stationary object identified in the fourth image as a result of the image recognition processing,
wherein the inference unit, the generation unit, and the autonomous driving unit are each implemented via at least one processor.

2. The information processing device according to claim 1,
wherein the inference unit checks, after the fourth image is generated, the fourth image against a plurality of images taken in a past and infers an image taken in a past at a position corresponding to an image to be taken at a next timing of the fourth image, and,
in a case where an image is acquired at the next timing of the fourth image, the generation unit corrects, on a basis of the image taken in a past at a position corresponding to the image to be taken at the next timing of the fourth image, an image acquired at the next timing of the fourth image.

3. The information processing device according to claim 1,
wherein the inference unit infers the third image corresponding to the second image taken by the traveling object equipped with a sensor.

4. The information processing device according to claim 3,
wherein, on a basis of traveling speed of the traveling object that has taken the first image, the inference unit infers the third image from a plurality of images taken in a past.

5. The information processing device according to claim 3,
wherein, on a basis of position information of the traveling object, the inference unit infers a third image that is an image taken in a past at a position corresponding to the second image.

6. The information processing device according to claim 1,
wherein the generation unit generates the fourth image by correcting the second image on a basis of a boundary of natural environment included in the third image.

7. The information processing device according to claim 1,
wherein, in a case where transmittance of the third image is higher than transmittance of the second image, the generation unit generates the fourth image by executing haze removal on the second image on a basis of the third image.

8. The information processing device according to claim 1,
wherein the generation unit generates the fourth image by executing noise removal on the second image on a basis of motion vector calculated on a basis of the third image and an image taken before or after the third image.

9. The information processing device according to claim 1,
wherein the generation unit generates the fourth image by executing noise removal on the second image on a basis of information regarding the stationary object identified on a basis of the third image and an image taken before or after the third image.

10. The information processing device according to claim 1,
wherein the generation unit compares pixel information of the third image and of the fourth image, and selects which image is to be accumulated in a storage unit.

11. An information processing method comprising, by a computer:
inferring, on a basis of a result of checking a first image against a plurality of images taken in a past, a third image that is an image taken in a past at a position corresponding to a second image to be taken at a next timing of the first image;
generating a fourth image that is an image obtained by correcting, on a basis of the third image in a case where the second image is acquired, the second image by performing environmental deterioration compensation to reduce environmental influence degrading a quality of the second image when taken;
performing image recognition processing on the fourth image; and
controlling autonomous driving by a travelling object or alerting a user of the travelling object based on a stationary object identified in the fourth image as a result of the image recognition processing.

12. A non-transitory computer-readable medium having embodied thereon an information processing program, which when executed by a computer causes the computer to execute a method, the method comprising:
inferring, on a basis of a result of checking a first image against a plurality of images taken in a past, a third image that is an image taken in a past at a position corresponding to a second image to be taken at a next timing of the first image;
generating a fourth image that is an image obtained by correcting, on a basis of the third image in a case where the second image is acquired, the second image by performing environmental deterioration compensation to reduce environmental influence degrading a quality of the second image when taken;
performing image recognition processing on the fourth image; and
controlling autonomous driving by a travelling object or alerting a user of the travelling object based on a stationary object identified in the fourth image as a result of the image recognition processing.

* * * * *